(12) United States Patent
Cunningham et al.

(10) Patent No.: US 7,851,402 B2
(45) Date of Patent: Dec. 14, 2010

(54) METHOD FOR SOLUBILIZING METAL OXIDES BY SURFACE TREATMENT, SURFACE TREATED METAL OXIDE SOLUTIONS AND METHOD FOR SEPARATING METAL OXIDES

(75) Inventors: Patrick Desmond Cunningham, Spiddal (IE); James McManus, Athone (IE)

(73) Assignee: National University of Ireland, Galway, Galway (IE)

( * ) Notice: Subject to any disclaimer, the term of this patent is extended or adjusted under 35 U.S.C. 154(b) by 1005 days.

(21) Appl. No.: 10/580,097

(22) PCT Filed: Nov. 22, 2004

(86) PCT No.: PCT/IE2004/000163

§ 371 (c)(1),
(2), (4) Date: May 19, 2006

(87) PCT Pub. No.: WO2005/049520

PCT Pub. Date: Jun. 2, 2005

(65) Prior Publication Data

US 2007/0140937 A1     Jun. 21, 2007

(30) Foreign Application Priority Data

Nov. 21, 2003    (IE)   ............................... S2003/0869

(51) Int. Cl.
| | | |
|---|---|---|
| B01J 31/00 | (2006.01) |
| B01J 23/00 | (2006.01) |
| B05D 7/00 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| B32B 15/04 | (2006.01) |
| B32B 3/26 | (2006.01) |
| C23C 16/40 | (2006.01) |
| C04B 14/04 | (2006.01) |
| C07C 49/92 | (2006.01) |
| C01G 17/00 | (2006.01) |
| C01G 19/00 | (2006.01) |
| C01G 21/00 | (2006.01) |
| C22B 13/00 | (2006.01) |
| C22B 25/00 | (2006.01) |
| C22B 41/00 | (2006.01) |
| C09K 15/04 | (2006.01) |

(52) U.S. Cl. ............... 502/308; 502/152; 502/156; 502/157; 502/311; 502/312; 502/319; 502/350; 502/352; 427/214; 427/215; 427/220; 428/403; 428/404; 428/688; 428/689; 428/472; 428/304.4; 428/357; 556/40; 423/89; 252/399

(58) Field of Classification Search ............... 502/152, 502/156, 157, 305–355; 427/214, 215, 220; 428/403, 404, 688, 689, 472, 304.4, 357; 106/287.19, 490; 556/40; 423/89; 252/399
See application file for complete search history.

(56) References Cited

U.S. PATENT DOCUMENTS

| | | | | |
|---|---|---|---|---|
| 4,923,950 | A * | 5/1990 | Ravaine et al. ............... 528/38 |
| 4,994,429 | A * | 2/1991 | Wieserman et al. ......... 502/401 |
| 5,126,210 | A * | 6/1992 | Wieserman et al. ......... 428/469 |
| 5,397,642 | A * | 3/1995 | Li et al. ....................... 428/403 |
| 6,008,285 | A * | 12/1999 | Kasemann et al. .......... 524/430 |
| 6,087,294 | A * | 7/2000 | Klabunde et al. ........... 502/224 |
| 6,228,921 | B1 * | 5/2001 | Kasemann et al. .......... 524/381 |
| 6,251,303 | B1 * | 6/2001 | Bawendi et al. ....... 252/301.4 R |
| 6,399,688 | B1 | 6/2002 | Iida |
| 6,533,966 | B1 * | 3/2003 | Nonninger et al. ....... 252/520.1 |
| 6,866,885 | B1 * | 3/2005 | Clough ....................... 427/212 |
| 6,887,517 | B1 * | 5/2005 | Cook et al. .................. 427/214 |
| 6,936,100 | B2 * | 8/2005 | Tadakuma .................... 117/68 |
| 6,986,943 | B1 * | 1/2006 | Cook et al. .................. 428/402 |
| 7,531,293 | B2 * | 5/2009 | Afzali-Ardakani et al. .. 430/296 |

| | | | |
|---|---|---|---|
| 7,560,161 B2 * | 7/2009 | Qi et al. | 428/403 |
| 2004/0118332 A1 | 6/2004 | Tadakuma | |
| 2008/0138600 A1 * | 6/2008 | Cunningham et al. | 428/304.4 |

FOREIGN PATENT DOCUMENTS

| | | |
|---|---|---|
| DE | 4338361 A1 | 11/1993 |
| EP | 1152040 A1 | 11/2000 |
| EP | 1243631 A1 | 9/2002 |
| WO | 0014017 | 3/2000 |
| WO | 00/71465 * | 11/2000 |
| WO | 03027191 A2 | 4/2003 |

OTHER PUBLICATIONS

"The surface science of titanium dioxide," Ulrike Diebold. Surface Science Reports 48 (2003), pp. 53-229.*

Carroll et al., "Characterisation of Tin Oxide Coatings Produced Using a New Novel Deposition Technique", Abstract of Oral Presentation at the ESB 18th European Conference on Biomaterials, SI Center, Stuttgart, Germany, Oct. 1-4, 2003.

Rushe et al., "The Characterisation of Tin Oxide Films Formed on Various Substrates by a Novel Deposition Technique", Abstract of Oral Presentation at the Summer Programme at the Department of Chemistry, Trinity College Dublin, May 14-16, 2003.

Cunningham et al., "Examination and Analysis of Tin Oxide Films Obtained by a Novel Deposition Technique Using a Range of Microscopy Techniques", Abstract of Oral Presentation at the Scientific & Social Programme 26th Annual M.S.I. Meeting, National University of Ireland, Galway, Aug. 28-30, 2002.

Cunningham et al., "The Analysis of Tin Oxide Films Obtained by a Novel Deposition Technique", Second Annual Analytical Science Conference, Apr. 1-12, 2002.

* cited by examiner

*Primary Examiner*—Patricia L Hailey
(74) *Attorney, Agent, or Firm*—The Webb Law Firm

(57) ABSTRACT

The invention relates to soluble metal oxides and mixed metal oxides and to solutions comprising metal oxides and mixed metal oxides. The invention further relates to a process for preparing a soluble metal oxide and a soluble mixed metal oxide and additionally relates to a process for modifying the solubility of a soluble metal oxide. The metal oxides, mixed metal oxides and solutions thereof have a number of applications and in particular are suitable for use as catalysts and also as precursors for the formation of metal films.

19 Claims, 9 Drawing Sheets

Figure 1:
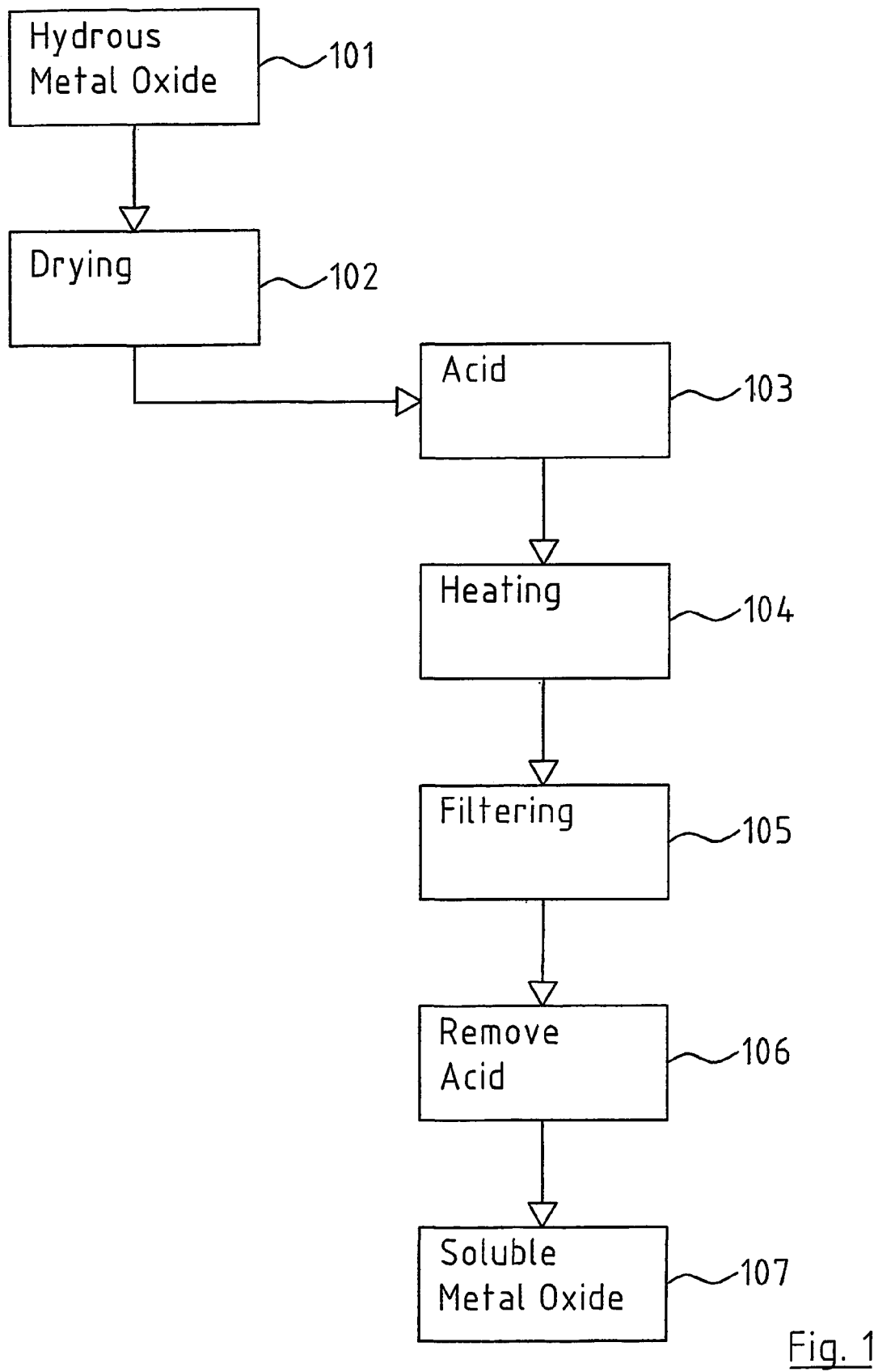

METHOD FOR SOLUBILIZING METAL OXIDES BY SURFACE TREATMENT, SURFACE TREATED METAL OXIDE SOLUTIONS AND METHOD FOR SEPARATING METAL OXIDES

The present invention relates to a soluble metal oxide and a soluble mixed metal oxide. The invention also relates to a solution comprising a metal oxide and to a solution comprising a mixed metal oxide. The invention further relates to a process for preparing a soluble metal oxide and to a; process for preparing a soluble mixed metal oxide, and still further relates to a process for modifying the solubility of a soluble metal oxide.

In the specification the term "metal oxide" refers to a chemical compound in which oxygen is combined with a metal. In the specification the term "particle" refers to a crystalline structure having an average dimension of 100 Å or less.

Metal oxides and in particular tin oxide have an important role in many coating applications:

(a) Domestic glassware and bottles contain a thin coating of tin oxide to greatly enhance impact resistance. Thicker coatings confer iridescent appearances that provide attractive finishes to glass objects.
(b) Thin coatings of tin oxide on window glass serve to reflect indoor heat inwards in winter time and reduce solar heating in summer time.
(c) Conducting tin oxide films, have a vital role as transparent electrodes in the construction of many important devices including light harvesting solar cells, electrochromic cells and liquid crystal displays. Conducting tin oxide films can also be applied to car and aircraft windscreens.
(d) Thin coatings of tin oxide are used to improve bonding characteristics of surfaces. A coating of tin oxide on alumina can be used to enhance bonding for high-alumina dental ceramics.
(e) Tin oxide films can be used in many applications and industries as gas sensors.
(f) Metal oxide coatings reduce surface friction and thus have applications for moving parts in engines, hip replacements and stents.
(g) Metal oxide coatings also have important roles in other applications such as use in the production of industrial catalysts. In such applications, the catalyst fabrication process and pre-history is vitally important for catalytic performance.

Current methods for the preparation of metal oxide films and coatings from metal oxides and other metal compounds include:

a) Vacuum techniques such as Chemical Vapour Deposition (CVD), electron beam evaporation and reactive sputtering. Chemical Vapour Deposition is the growth of thin solid films as the result of thermo-chemical vapour-phase reactions. This technique requires however specialised equipment such as a vacuum chamber and the use of suitable volatile metal precursors. The size of the object to be coated is limited to the size of the vacuum chamber. Furthermore, there is an associated high cost of maintaining the high vacuum required and the precise heating control to vaporise the precursor material.
b) Pyrolysis/hydrolysis of the vapour of a suitable metal compound on a hot substrate surface. In the case of large-scale industrial tin oxide coating of bottles, this technique is adopted and requires the use of tin tetrachloride and butylin trichloride as precursors. Tin tetrachloride is a highly corrosive caustic liquid which is both toxic and environmentally hazardous. Both compounds produce corrosive hydrogen chloride gas during the hydrolysis and subsequent formation of tin oxide films.
c) Evaporation of a precursor solution, sol or solvent dispersion from the surface of the substrate. Precursor solutions, sols and dispersions fall broadly into two types.
  (i) A solution containing a metal compound (usually an alkoxide) can be applied to a substrate and can then undergo hydrolysis to yield the metal oxide. The desired oxide is only obtained after total hydrolysis of the metal alkoxide on the substrate surface to give a hydroxide or hydrous oxide after which heating to very high temperatures in the region of 500° C. yields the oxide. This is a slow process and demands precise chemical control of the precursor solution. Additionally the metal oxide is not available for modification in downstream processes such as film formation. It will be appreciated that this process is necessary to yield the oxide as the solutions containing the metal compounds do not at any stage contain a metal oxide but merely a precursor to the metal oxide.
  (ii) A solvent containing a dispersed metal oxide in the form of a dispersion colloid or a sol. A sol is defined as a colloidal solution consisting of a suitable dispersion medium and a colloidal substance which is distributed throughout the dispersion medium. Dispersants must be added to improve the dispersibility of the oxides.

Application of the solutions, sols, colloids, and dispersions may be by a range of techniques which includes spin coating, curtain-flow coating, meniscus coating, dip coating, roll-on coating or aerosol coating. The method of coating depends on a number of factors, including the physical nature and stability of the solution, sol, colloid and dispersion and both the size and shape of the surface to be coated. An application technique such as spin coating is suited to small-scale coating whereas techniques such as curtain-flow and aerosol coating are suitable for large-scale coating. Aerosol coating is particularly suited to the coating of irregular shaped objects.

The coating methods of (c) are preferable to those described in both (a) and (b) in that they are considerably cheaper and easier to apply. Furthermore they are more suited to the coating of large and irregular shaped objects. The techniques outlined in (c) work best when the material to be fabricated into the film is in solution. A metal oxide therefore in solution would prove particularly advantageous with these techniques. Furthermore a metal oxide soluble in a range of solvents would provide increased versatility within these applications.

PCT Publication No. WO 03/027191 discloses a curable liquid resin composition comprising a metal oxide, an organic compound, a compound having two or more polymerizable unsaturated, groups, in the molecule, a specific alkylene glycol organic solvent and a polymerization initiator. The metal oxides are dispersed in the liquid resin compositions.

European Patent Publication No. 1 243 631 discloses an organic solvent based dispersion of conductive powder and conductive coating material comprising conductive tin oxide particles coated with an organic metal coupling agent on the surface of the tin oxide particles and a dispersant in the form of a salt to achieve dispersibility.

U.S. Pat. No. 6,399,688 discloses a coating composition comprising a metal oxide a hydrophilic binder, a colloidal silica and a solvent.

The disadvantage of the above compositions is that dispersants are required which are difficult or impossible to remove during fabrication. In fact it is this feature of dispersants that makes them undesirable in many instances. Dispersing agents are generally unfavourable in that they cannot be removed during fabrication of the desired film. Furthermore, the presence of dispersants can present difficulties when attempting to modify the tin oxide particles in the dispersion. For example, the dispersants can hinder the addition of metal dopants or desired surface groups to the tin oxide particles.

European Patent Publication no. 1 152 040 discloses an aqueous coating solution for forming a transparent conductive film, a method for producing a transparent conductive tin oxide film and, a transparent conductive tin oxide film. The coating solution may be prepared from tin oxide and is prepared by adding hydrous tin oxide to distilled water and bringing the pH to a value of at least 10. The disadvantage of this type of solution is that tin is corrosive due to the high pH involved and would therefore be unsuitable for certain applications. Additionally as the solution is predominantly an aqueous solution and it could not be used in any applications requiring organic solvents. Furthermore, it is not possible to extract the soluble metal oxide from this solution and store it in this state.

Thus there is need for a metal oxide solution suitable for use in a number of applications. There is further a need for a soluble metal oxide which can be dissolved in a range of solvents.

STATEMENTS OF INVENTION

According to the invention there is provided a soluble metal oxide comprising:
  one or more metal oxide crystallite particles;
  each crystallite particle comprising a plurality of metal and oxygen moieties;
  an inner organic binding group attached to at least one metal moiety; and
  an outer organic binding group attached to at least one inner organic binding group.

The advantage of providing a soluble metal oxide is that it can either be dissolved in a solvent to provide a solution or stored in this form as a powder and redissolved in an appropriate solvent to form a solution. The soluble metal oxide is thus extremely flexible, as it can be used to provide a number of solutions which can be adapted to any application. Additionally, the soluble metal oxides form true solutions therefore obviating the need for undesirable additives such as dispersants.

The metal oxide crystallites in solution are remarkably chemically active such that considerable modification of the crystallites in solution, to meet specific functional demands, is easily achievable without loss of solubility. Furthermore the surfaces of a metal oxide when dissolved in a solution are more chemically active than when the metal oxide is dispersed in a dispersion or resin or in the form of a gel. Additionally due to the enhanced surface activity and chemical reactivity of the metal oxides in solution they can be usefully employed to produce doped and conducting metal oxide films for the electronics industry and gas sensor devices, for a range of applications.

Preferably, each crystallite particle further, comprises at least one hydroxyl group.
  Further preferably
  each inner organic binding group is attached to each metal moiety by a covalent bond; and
  each outer organic, binding group is attached to each inner organic binding group by a hydrogen bond.

The advantage of having inner and outer organic blinding groups is that they allow increased solubility of the metal oxide particles in the organic solvent. The inner organic binding groups directly bonded to the metal oxide generally do not give rise to solubility. They are however required since their presence is absolutely essential for the attachment of the outer organic binding group in sufficient quantity to the metal oxides. The outer organic binding groups control solubility of the metal oxide.

In some cases however depending on the type of organic group, it has been found that the metal oxides are soluble with the presence of inner organic binding groups only. This has found to be particularly true for fluoroacetate groups as organic binding groups and is due to the presence of exposed fluorine atoms. As fluorine has unusual solubility properties, it is expected that any compound comprising fluorine having the ability to provide fluorine atoms would have the same effect. Additionally any other compound displaying unusual solubility properties would be expected to work in the same way.

In one embodiment of the invention the soluble metal oxide is of the general formula:

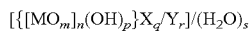

wherein:
M represents a metal moiety
O represents an oxygen moiety
m is a variable dependent on the oxidation state of the metal moiety (M) and
  is in the region of between 1 and 3
n represents the number of metal oxides in the crystallite particle
OH represents an hydroxyl group
X represents an inner organic binding group
Y represents an outer organic, binding group
$H_2O$ represents hydrogen bonded water.
p, q, r and s represent variables dependent in particular on the number of metal oxides in the crystallite particle (n), and reaction conditions Preferably X represents the inner organic binding group of the general formula:

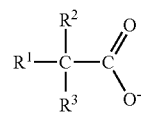

Wherein:
$R^1$=an organic group, a halo-organic group, a hydrogen or a halogen;
$R^2$=an organic group, a halo-organic group, a hydrogen or a halogen; and
$R^3$=an organic group, a halo-organic group, a hydrogen or a halogen.

Further preferably
$R^1$ represents a straight-chain, branched chain or cyclic organic group with up to 20 carbons, a straight-chain, branched-chain, or cyclic halo-organic group with up to 20 carbons and up to 41 halogen atoms, a hydrogen or a halogen;
$R^2$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
$R^3$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

Preferably Y represents the outer organic binding group of the general formula:

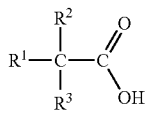

Wherein:

R$^1$=an organic group, a halo-organic group, a hydrogen or a halogen;

R$^2$=an organic group, a halo-organic group, a hydrogen or a halogen; and

R$^3$ an organic group, a halo-organic, group, a hydrogen or a halogen.

Further preferably

R$^1$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen;

R$^2$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and R$^3$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

Ideally each metal oxide crystallite particle is a nanocrystallite particle having an average particle size in the range of between 5 and 100 Å. This is advantageous in that as the particle size of the metal oxide particles are very small, the surface area is very large resulting in enhanced reactivity with the organic binding groups.

Preferably the metal moiety is selected from the group comprising one of tin and titanium.

According to the invention, there is further provided a soluble mixed metal oxide comprising:

a soluble metal oxide wherein each crystallite particle further comprises:

at least one metal ion attached to each crystallite particle.

The amount of metal ions which attach to and become embodied in the crystallite particle is highly variable and depends on a number of factors, including the solvent within the solution during preparation of the mixed metal oxide, the type of metal ion, the compatibility between the metal ion and the solvent or with the metal moiety and the reaction conditions. It will be appreciated that modification of each of these factors will result in an optimum quantity of each metal ion.

Preferably each inner organic binding group is attached to either a metal moiety or to both a metal moiety and to a metal ion;

each outer organic binding group is attached to either a metal ion, or to an inner organic binding groups, or to both a metal ion and an inner organic binding group; and wherein the metal ions are attached to any combination of the following:

an oxygen moiety, an hydroxyl group;

an inner organic binding group; and an outer organic binding group.

Further preferably each inner organic binding group is attached to each metal moiety by a covalent bond and to each metal ion by either a covalent bond or a donor bond;

each outer organic binding group is attached to each inner organic binding group by a hydrogen bond and to each metal ion by either a covalent bond or a donor bond; and each metal ion is attached to each oxygen moiety by a covalent bond, to each hydroxyl group by either a donor bond or a covalent bond, to each inner organic binding group by either a covalent or a donor bond, and to each outer organic binding group by either a covalent or a donor bond.

In another embodiment of the invention, the soluble mixed metal oxide is of the general formula:

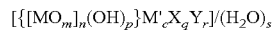

M represents a metal moiety

O represents an oxygen moiety m is a variable dependent on the oxidation-state of the metal moiety (M) and is in the region of between 1 and 3' n represents the number of metal oxides in the crystallite particle

OH represents an hydroxyl group

M' represents a metal ion

X represents an inner organic binding group

Y represents an outer organic binding group

H$_2$O represents hydrogen bonded water c, p, q, r and s represent variables dependent in particular on the number of metal oxides in the crystalline particle (n), and reaction conditions Ideally the metal ion (M') is selected from the group comprising of tetravalent tin, divalent tin, indium, antimony, zinc, titanium, vanadium, chromium, manganese, iron, cobalt, nickel, zirconium, molybdenum, palladium, iridium and magnesium.

The resultant mixed metal oxides can be any of tin/tetravalent tin oxide, tin/divalent tin oxide, tin/indium oxide, tin/antimony oxide tin/zinc oxide, tin/titanium oxide, tin/vanadium oxide, tin/chromium oxide tin/manganese oxide, tin/iron oxide, tin/cobalt oxide, tin/nickel oxide, tin/zirconium oxide, tin/molybdenum oxide, tin/palladium oxide, tin/iridium oxide, tin/magnesium oxide, titanium/tetravalent titanium oxide, titanium/divalent titanium oxide, titanium/indium oxide, titanium/antimony oxide, titanium/zinc oxide, titanium/tin oxide, titanium/vanadium oxide, titanium/chromium oxide, titanium/manganese oxide, titanium/iron oxide, titanium/cobalt oxide, titanium/nickel oxide, titanium/zirconium oxide, titanium/molybdenum oxide, titanium/palladium oxide, titanium/iridium oxide, titanium/magnesium oxide.

Preferably X represents the inner organic binding group of the general formula:

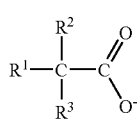

Wherein:
R¹=an organic group, a halo-organic group, a hydrogen or a halogen;
R²=an organic group, a halo-organic group, a hydrogen or a halogen; and
R³=an organic group, a halo-organic group, a hydrogen or a halogen.

Further preferably
R¹ represents a straight-chain, branched-chain or cyclic organic group with up to 20 carbons, a straight-chain, branch-chain, or cyclic halo-organic group with up to 20 carbons and up to 41 halogen atoms, a hydrogen or a halogen;
R² represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
R³ represents a straight-chain, branched-chain or cyclic organic group with up to 20 carbons, a straight-chain, branched-chain, or cyclic halo-organic group with up to 20 carbons and up to 41, halogen atoms, a hydrogen or a halogen;

Preferably Y represents the outer organic binding group of the general formula.

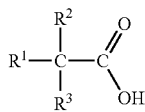

Wherein:
R¹=an organic group, a halo-organic group, a hydrogen or a halogen.
R²=an organic group, a halo-organic group, a hydrogen or a halogen; and
R³=an organic group, a halo-organic group, a hydrogen or a halogen.

Further preferably
R¹ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen;
R² represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
R³ represents a straight-chain, branched-chain or cyclic organic group with up to 20 carbons, a straight chain branched-chain, or cyclic halo-organic group with up to 20 carbons and up to 41 halogen atoms, a hydrogen or a halogen;

Ideally each crystallite particle is a nanocrystallite particle having an average particle size in the range of between 5 and 100 Å.

Preferably the metal moiety is selected from the group comprising one of tin and titanium.

According to the invention there is still, further provided a process for preparing a metal oxide solution comprising:
adding an amount of insoluble hydrous; metal oxide to an amount of organic acid to provide a metal oxide suspension;
heating the suspension until the suspension forms a solution; wherein
the insoluble hydrous metal oxide is added to a sufficient amount of organic acid to allow a solution to be formed during heating.

According to the invention there is further provided a process for preparing a soluble metal oxide comprising:
preparing a metal oxide solution; and
removing the organic acid from the solution to provide the soluble metal oxide.

This process for preparing metal oxide solutions and soluble metal oxides is a fast, inexpensive and environmentally friendly process.

The advantage of the metal oxide being hydrous is that there are water and hydroxyl molecules surrounding the metal oxide particles, which, can be substituted easily by organic binding groups, which can then bind to the metal oxide particles.

The acid used must be an organic acid as it has been found that other types of acids do not interact in the same way with the metal oxides. For example mineral acids such as nitric acid are not suitable because the oxide breaks down and an oxide solution is not formed. Additionally the advantage of using the organic acids is that their removal at elevated temperature during formation of metal oxide films does not leave groups that would introduce undesirable impurities into the metal oxide.

The advantage of heating the suspension is fiat it facilitates a fast exchange reaction between the hydroxyl groups of the hydrous metal oxide and the organic binding groups of the acid so as to bond a sufficient percentage of organic binding groups to the metal oxide particles.

Removal of the organic acid from the solution is generally carried out at a reduced pressure and preferably less than 25 mm.Hg in that this reduced pressure facilitates the fast removal of acid without any significant loss of organic binding groups.

Preferably the acid is formic acid or is of the general formula:

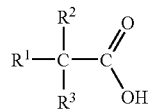

Wherein:
R¹=an organic group, a halo-organic group, a hydrogen or a halogen;
R²=an organic group, a halo organic group, a hydrogen or a halogen; and
R³=an organic group; a halo organic group, a hydrogen or a halogen.

Further preferably
R¹ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen;
R² represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
R³ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

In one embodiment of the invention there is provided a process for preparing a mixed metal oxide solution comprising:
preparing a metal oxide solution;
adding a metal to the solution; and
filtering the solution.

In another embodiment of the invention there is provided a process for preparing a soluble mixed metal oxide comprising:
preparing a mixed metal oxide solution; and
removing the organic acid to provide the soluble mixed metal oxide.

In a further embodiment of the invention, there is provided a process for preparing a mixed metal oxide solution comprising:
preparing a soluble metal oxide;
dissolving the metal oxide in a solvent to provide a solution;
adding a metal to the solution; and
filtering the solution.

Preferably the solvent is selected from the group comprising one of tetrahydrofuran, dimethylformamide, dimethyl sulphoxide, ethyl acetate, amyl acetate, pyridine, water, an alcohol having the general formula:

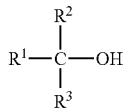

Where $R^1$, $R^2$ and $R^3$ represent one of:
$R^1=R^2=R^3=H$
$R^1=R^2=H; R^3=(CH)_nCH_3$ (n=0, 1, 2, 3, 4, 5)
$R^1=H; R^2=R^3=CH_3$
$R^1=H; R^2=CH_3; R^3=CH_2CH_3$
$R^1=R^2=R^3=CH_3$
an ether having the general formula $R^1-O-R^2$
Where $R^1$ and $R^2$ represent one of:
$R^1=R^2=CH_2CH_3$
$R^1=CH_3; R^2=CH_2CH_3$
$R^1=R^2=(CH_2)_3CH_3$; and
A ketone having the general formula $R^1COR^2$
Where $R^1$ and $R^2$ represent one of:
$R^1=R^2=(CH_2)_n CH_3$ (n=0, 1, 2, 3, 4, 5)
$R^1=CH_3; R^2=CH_2CH_3$.

In a still further embodiment of the invention, there is provided a process for preparing a soluble mixed metal oxide comprising:
preparing a mixed metal oxide solution; and
removing the solvent to provide the soluble mixed metal oxide.

Both the soluble metal oxides and soluble mixed metal oxides can be recovered from, solution without loss of solubility. The recovered oxides are in the form of powders which have excellent long term stability and thus can be conveniently stored for future applications. The soluble mixed metal oxides and mixed metal oxide solutions are extremely valuable precursors for the fabrication of doped metal films for use in particular in the electronics industry, monoliths, castings and catalysts.

The resultant oxide powders can be dissolved in any appropriate solvent. In this case solubility in the organic solvents is remarkably high and the solutions are transparent and colourless.

Preferably prior to filtering the solution the solution is heated.

Further preferably the metal is added in powder form.

According to the invention there is still further provided a process for preparing a soluble metal oxide suitable for dissolving in a target organic solvent comprising:
selecting the target solvent;
determining an organic binding group which when attached to an insoluble metal oxide would allow the metal oxide to dissolve in the target solvent;
selecting an organic acid suitable for providing the organic binding group; and
preparing the soluble metal oxide using the selected organic acid.

According to the invention there is further provided a metal oxide solution prepared by;
adding an amount of insoluble hydrous metal oxide to an amount of organic acid to provide a metal oxide suspension;
heating the suspension until the suspension forms a solution; wherein
the insoluble hydrous metal oxide is added to a sufficient amount of organic acid to allow a solution to be formed during heating.

According to the invention there is still further provided a metal oxide solution comprising a soluble metal oxide and a solvent comprising one or more of tetrahydrofuran, dimethylformamide dimethyl sulphoxide, ethyl acetate, amyl acetate, pyridine, water, an alcohol having the general formula:

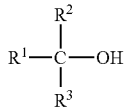

Where $R^1$, $R^2$ and $R^3$ represent one of:
$R^1=R^2=R^3=H$
$R^1=R^2=H; R^3=(CH)_nCH_3$ (n=0, 1, 2, 3, 4, 5)
$R^1=H; R^2=R^3=CH_3$
$R^1=H; R^2=CH_3; R^3=CH_2CH_3$
$R^1=R^2=R^3=CH_3$
an ether having the general formula $R^1-O-R^2$
Where $R^1$ and $R^2$ represent one of:
$R^1=R^2=CH_2CH_3$
$R^1=CH_3; R^2=CH_2CH_3$
$R^1=R^2=(CH_2)_3CH_3$; and
A ketone having the general formula $R^1COR^2$
Where $R^1$ and $R^2$ represent one of:
$R^1=R^2=(CH_2)_n CH_3$ (n=0, 1, 2, 3, 4, 5)
$R^1=CH_3; R^2=CH_2CH_3$ According to the invention there is further provided a mixed metal oxide solution prepared by
preparing a metal oxide solution;
adding a metal to the solution; and
filtering the solution.

According to the invention there is still further provided a mixed metal oxide solution comprising a soluble mixed metal oxide and a solvent comprising one or more of tetrahydrofuran, dimethylformamide, dimethyl sulphoxide, ethyl acetate, amyl acetate, pyridine, water, an alcohol having the general formula:

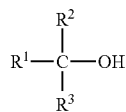

Where $R^1$, $R^2$ and $R^3$ represent one of:
$R^1=R^2=R^3=H$
$R^1=R^2=H$; $R^3=(CH)_nCH_3$ (n=0, 1, 2, 3, 4, 5)
$R^1=H$; $R=R^3=CH_3$
$R^1=H$; $R^2=CH_3$; $R^3=CH_2CH_3$
$R^1=R^2=R^3=CH_3$:
an ether having the general formula $R^1$—O—$R^2$
Where $R^1$ and $R^2$ represent one of:
$R^1=R^2=CH_2CH_3$
$R^1=CH_3$; $R^2=CH_2CH_3$
$R^1=R^2=(CH_2)_3CH_3$; and
A ketone having the general formula $R^1COR^2$
Where $R^1$ and $R^2$ represent one of:
$R^1=R^2=(CH_2)_nCH_3$ (n=0, 1, 2, 3, 4, 5)
$R^1=CH_3$; $R^2=CH_2CH_3$ These soluble metal oxides and mixed metal oxides have excellent long term stability in solution even on exposure to air having important implications for storage. The solutions do not contain any material which can interfere with the metal oxide during processing.

The solutions may be modified to provide, a desired viscosity if necessary to any point up to gel formation. Even in this state total transparency is maintained. Solutions can be highly concentrated or very dilute such that high quality thin and thick oxide films can be applied to a substrate using spin-coating, aerosol-spray coating, dip-coating, roll-on coating, meniscus coating, bar coating, curtain-flow coating or any other suitable coating technique.

The metal oxides in solution can also be easily applied to fabrics allowing the fabric to act as both a fire retardant and mordent for dyeing applications. Metal, oxide solutions and mixed metal oxide solutions also act as precursors for the formation of ceramic colour pigments.

According to the invention, there is provided a metal oxide film formed from the metal oxide solution.

According to the invention there is further provided a mixed metal oxide film formed from the mixed metal oxide solution.

These films have numerous applications such as forming transparent conducting films for the electronics industry, forming biocompatible films having drug retention and release properties. Further applications include use of the films to reduce the coefficient of friction of moving parts for example engine parts and hip replacements. The films could also be applied to monitors for example to reduce glare.

These films have further applications in the glass industry such as for example as domestic glass coatings to improve impact resistance and plate-glass coatings to improve thermal characteristics Additionally prior to formation of the films these solutions can be modified for example by attaching surface groups for specific applications. One example of this would be the addition of phosphate groups to improve biocompatibility.

The invention further relates to the use of a soluble metal oxide as a catalyst,
the use of a metal oxide solution as a catalyst,
the use of a soluble mixed metal oxide as a catalyst, and
the use of a mixed metal oxide solution as a catalyst.

The metal oxide solutions also introduce many new possibilities for the development of metal oxide catalysts and immobilised catalysts i.e. catalysts attached to the oxide surface. The metal oxide in solution has the potential of mimicking or indeed outperforming what are the catalytic activity and roles of organo stannoxanes organotin acetates and other organo metallic base catalysts and thus dispensing with these and what are disadvantages of the use of the latter. In the case of tin oxide, the availability of tin oxide solutions presents unforeseen possibilities for the development of tin oxide based catalysts. These may be of the mixed metal oxide type (e.g. tin/vanadium or tin/copper oxides) or surface bound catalysts, such as chiral oxidation catalysts which are extremely valuable in the pharmaceutical industry and may be immobilised on the tin oxide surface with relative ease and in high concentration when the oxide is in solution. The metal oxide solutions and mixed metal oxide solutions can act as precursors for the formation of homogenous and heterogenous metal oxide and mixed metal-oxide catalysts, with or without other desired groups attached to the surface.

The soluble metal oxides and mixed metal oxides are particularly useful as catalysts due mainly to the manner in which they were prepared. The process of preparing the soluble metal oxides and mixed metal oxides does not result in any undesirable impurities which would prevent their use as catalysts. Additionally as many reactions are carried out in solution, it is advantageous if the catalyst can also be in solution. The metal oxide and mixed metal oxide solutions are suitable for this reason.

According to the invention, there is still further provided a process for modifying the solubility of a soluble metal oxide comprising:
heating the soluble metal oxide to a temperature not greater than 300° C. to provide an insoluble metal oxide;
adding an amount of the insoluble metal oxide to an amount of organic acid to provide a metal oxide suspension;
heating the metal oxide suspension until the suspension forms a solution; and
removing the acid to provide a soluble metal oxide having modified solubility; wherein
the insoluble hydrous metal oxide is added to a sufficient amount of organic acid to allow a solution to be formed during heating.

According to the invention, there is further provided a process for modifying the solubility of a soluble metal oxide comprising;
adding an amount of soluble metal oxide to an excess amount of organic solvent to form a metal oxide solution;
adding acid drop wise to the solution; and
removing the organic solvent to provide a soluble metal oxide having modified solubility.

In one embodiment of the invention, the acid is selected from the group comprising one of orthophosphoric acid, phosphorous acid, hypophosphorous, organophosphonic acids and organophosphinic acids, organoarsonic and organoarsinic acids, and sulphonic acids.

In another embodiment of the invention the acid is replaced with a non-acid selected from the group comprising one of 8-hydroxyquinoline, polyethylene glycol or any non-acid which is capable of hydrogen bonding.

Preferably the organic solvent is selected from the group comprising of tetrahydrofuran, dimethylformamide, dimethyl sulphoxide, ethyl acetate, amyl acetate, pyridine, water, an alcohol having the general formula:

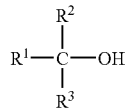

Where $R^1$, $R^2$ and $R^3$ represent one of:
$R^1=R^2=R^3=H$
$R^1=R^2=H; R^3=(CH)_nCH_3$ (n=0, 1, 2, 3, 4, 5)
$R^1=H; R^2=R^3=CH_3$
$R^1=H; R^2=CH_3; R^3=CH_2CH_3$
$R^1=R^2=R^3=CH_3$
an ether having the general formula $R^1$—O—$R^2$
Where $R^1$ and $R^2$ represent one of
$R^1=R^2=CH_2CH_3$
$R^1=CH_3; R^2=CH_2CH_3$
$R^1=R^2=(CH_2)_3CH_3$; and
A ketone having the general formula $R^1COR^2$
Where $R^1$ and $R^2$ represent one of:
$R^1=R^2=(CH_2)_nCH_3$ (n=0, 1, 2, 3, 4, 5)
$R^1=CH_3; R^2=CH_2CH_3$ According to the invention, there is provided a process for the extraction of tin from a mixed tin, antimony and iron ore comprising:
dissolving the ore in a mineral acid to form a mineral acid solution comprising aqueous tin, antimony and iron speirs;
increasing the pH of the solution to form hydrous tin, antimony and iron oxides within the solution and to precipitate hydrous tin, antimony and iron oxides from solution;
adding an excess amount of organic acid to the hydrous oxides to form an organic acid suspension;
heating the suspension;
filtering the suspension; and
removing the organic acid to provide a soluble tin oxide with iron residue.
Preferably, the process further comprises:
dissolving the soluble tin oxide with iron residue in an organic solvent to provide a solution;
maintaining the soluble tin oxide in solution for at least 24 hours;
filtering the solution to remove the iron residue; and
removing the organic solvent to provide a soluble tin oxide.

DETAILED DESCRIPTION OF THE INVENTION

Figure 2:
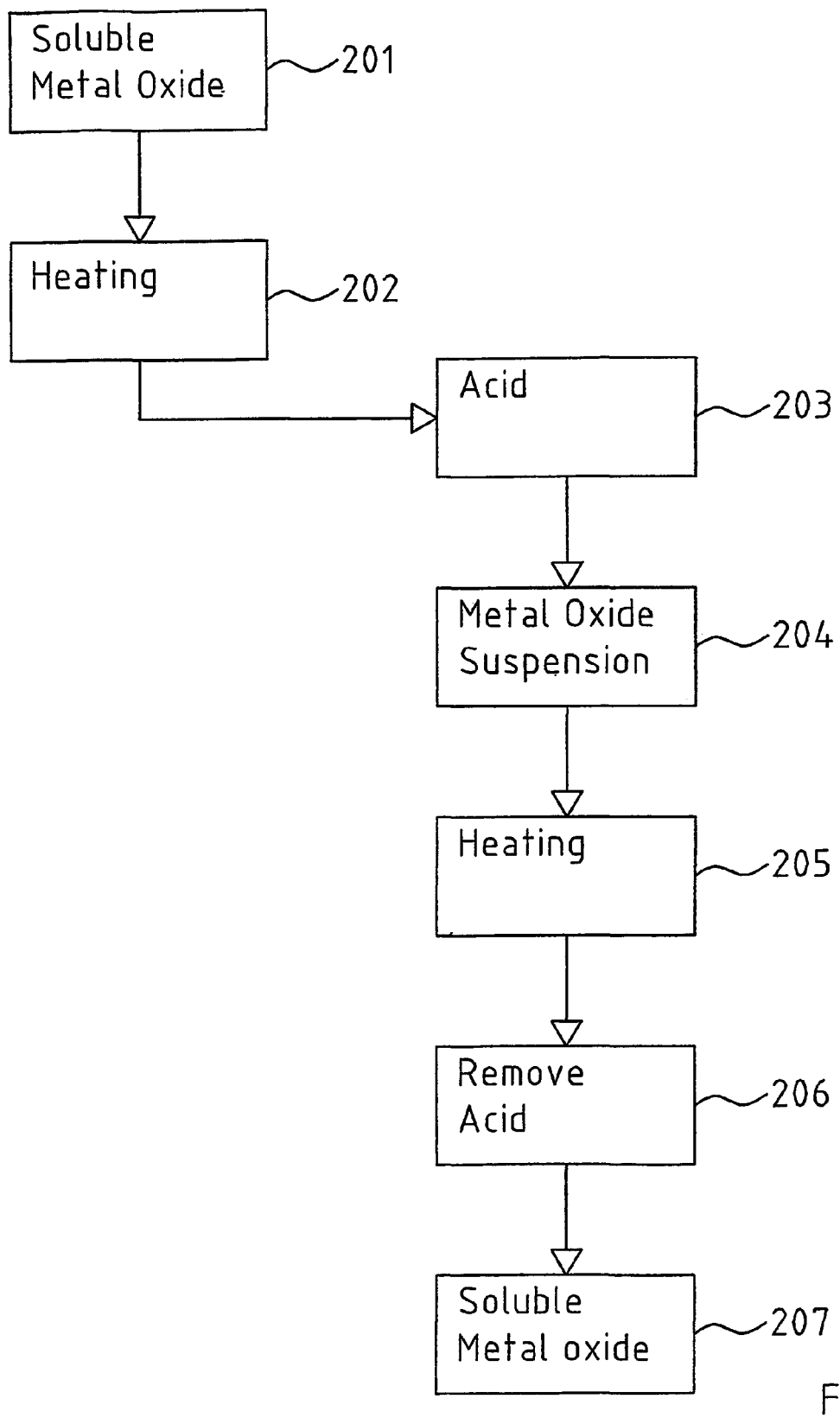
Figure 3:
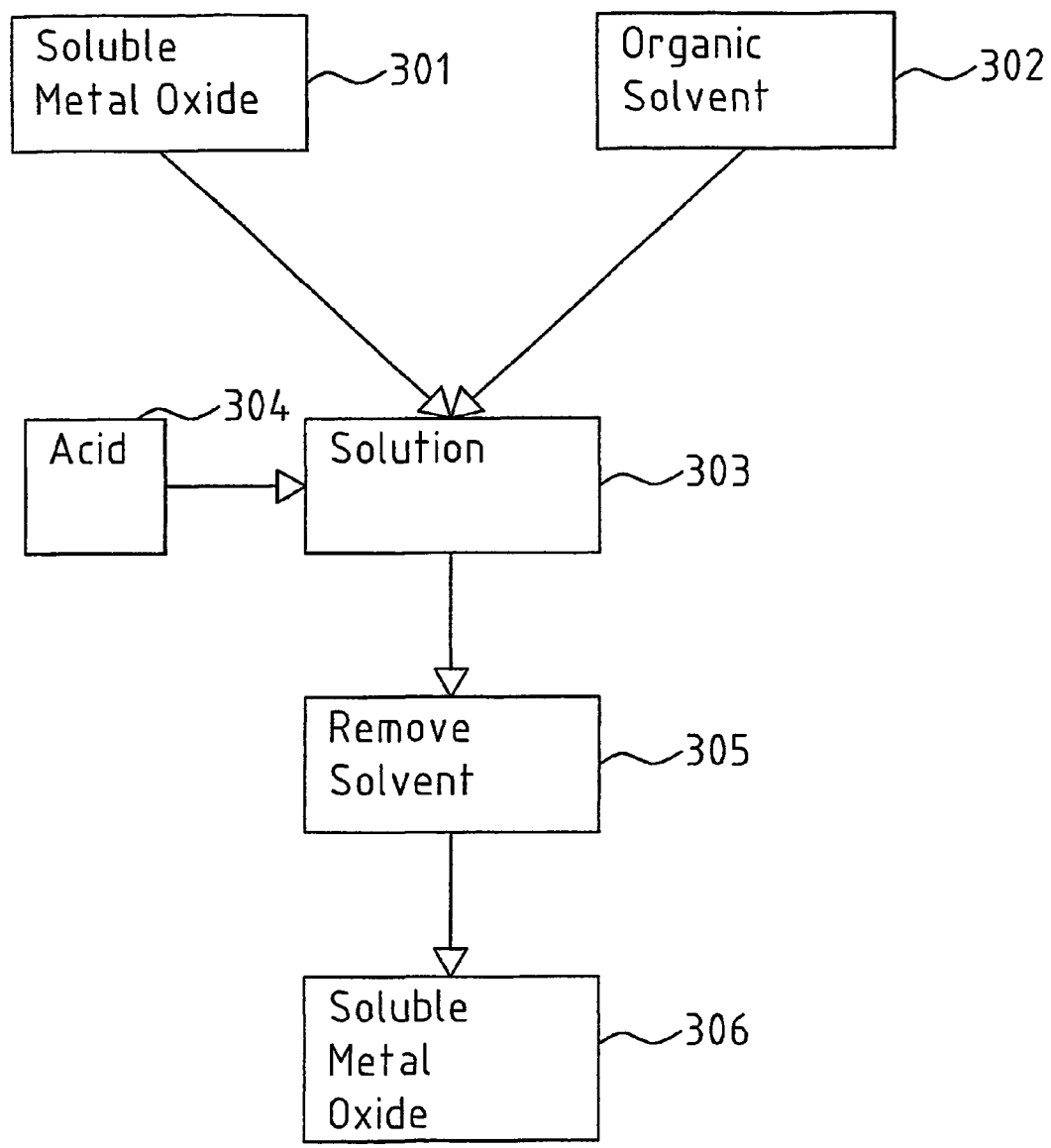
Figure 4:
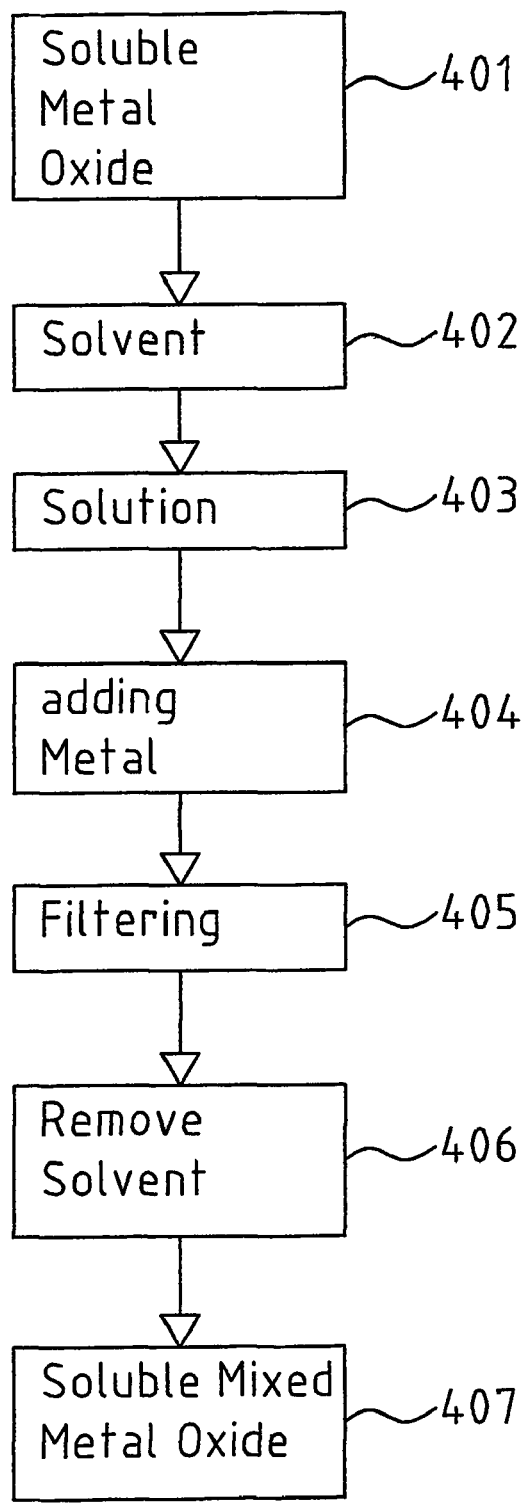
Figure 5:
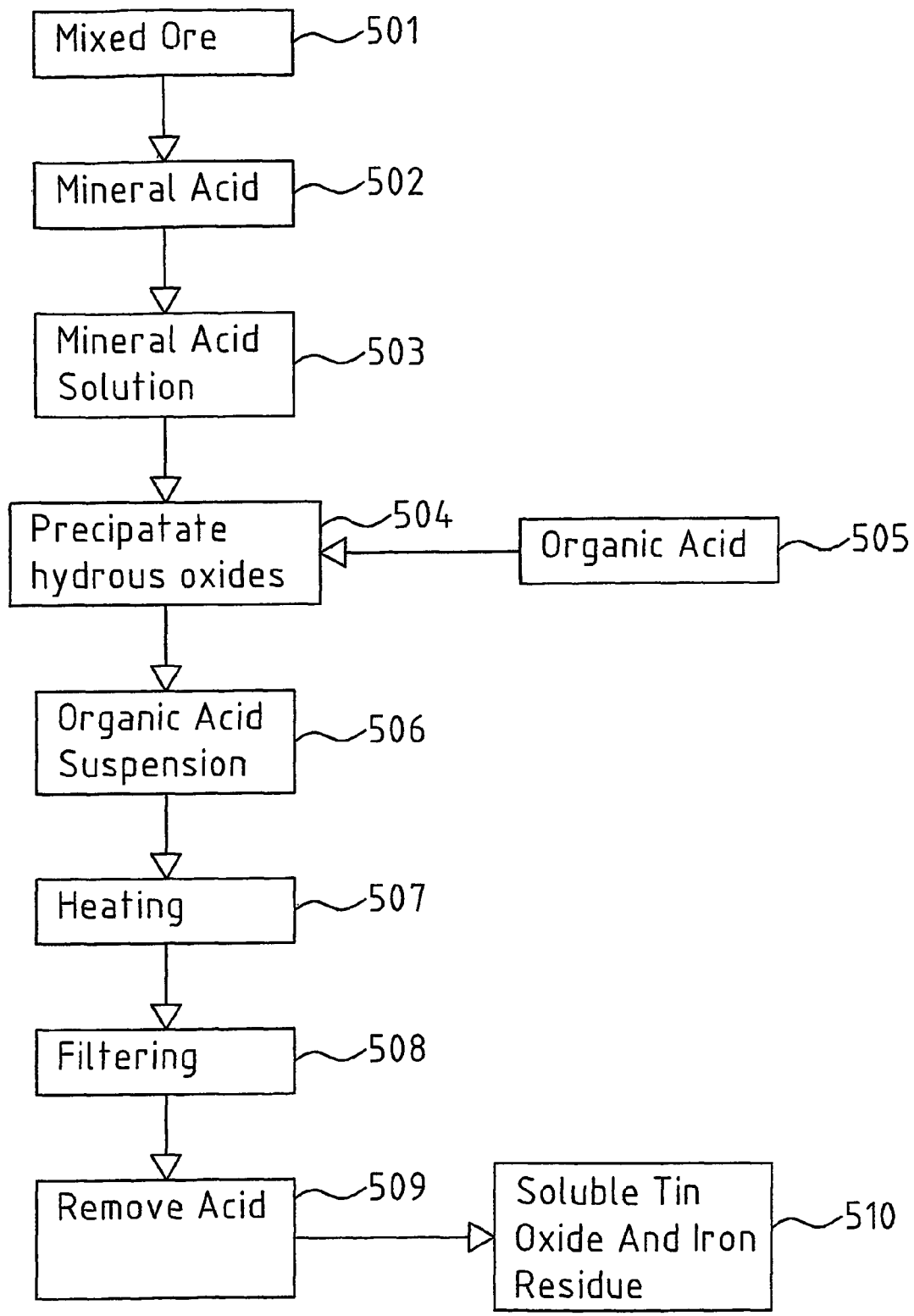

The invention will be more clearly understood from the following description of some embodiments thereof given by way of example only and with reference to the accompanying drawings wherein:
FIG. 1 is a process outline for the preparation of a soluble metal oxide.
FIG. 2 is a process outline for the modification of the solubility of a soluble metal oxide.
FIG. 3 is an alternative process outline for the modification to the solubility of a soluble metal oxide.
FIG. 4 is a process outline for the preparation of a soluble mixed metal oxide.
FIG. 5 is a process outline for the extraction of tin from a mixed tin, antimony and iron ore.

Figure 6:
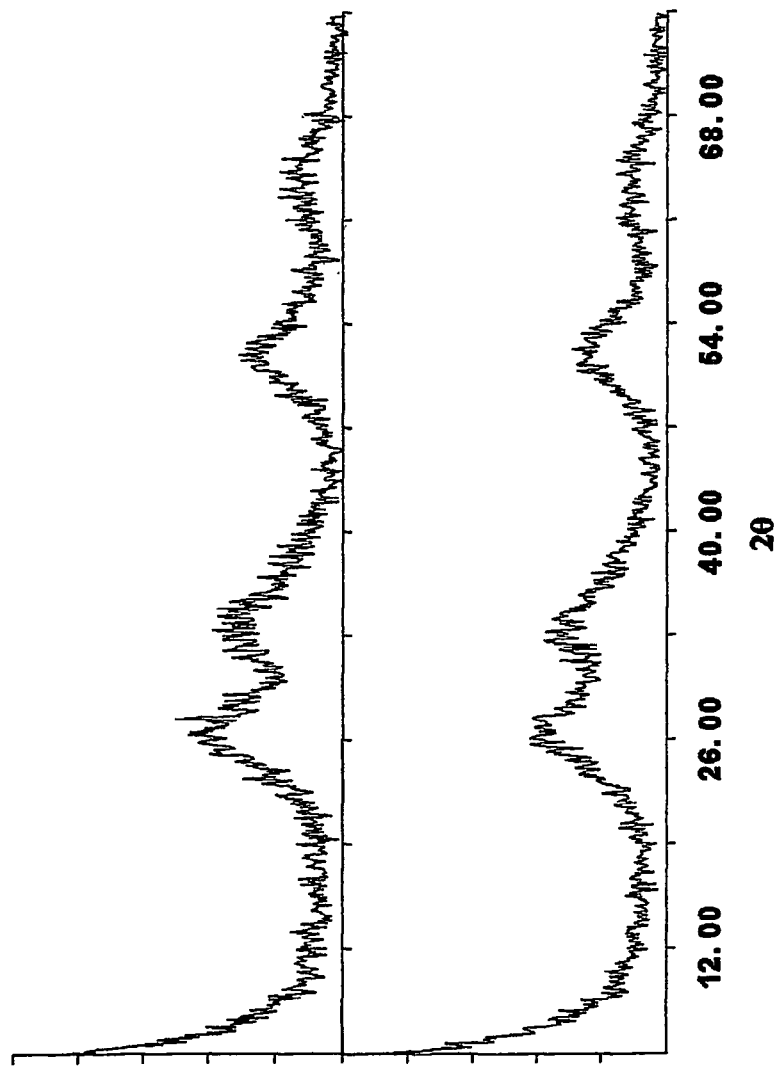
Figure 7:
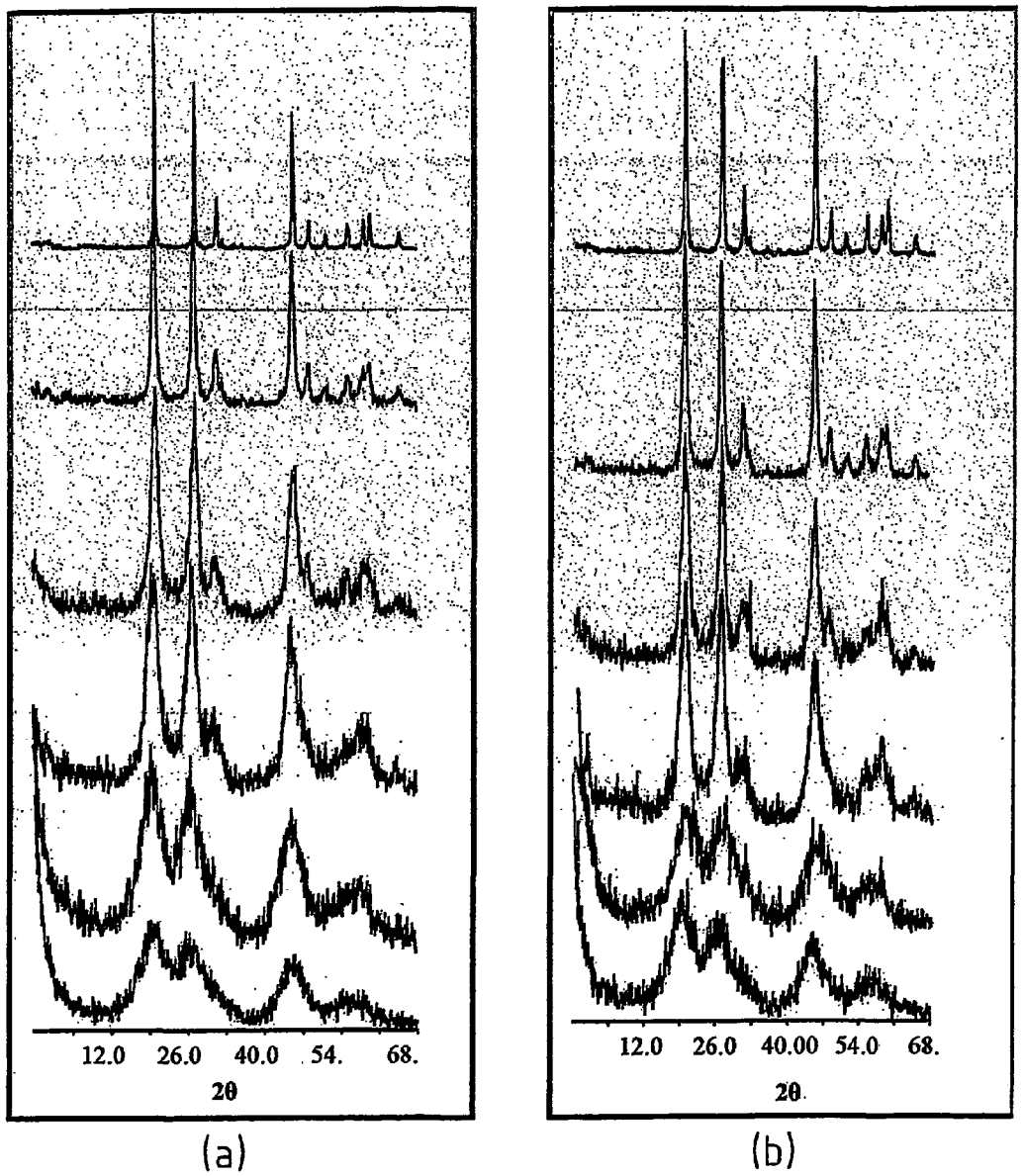
Figure 8:
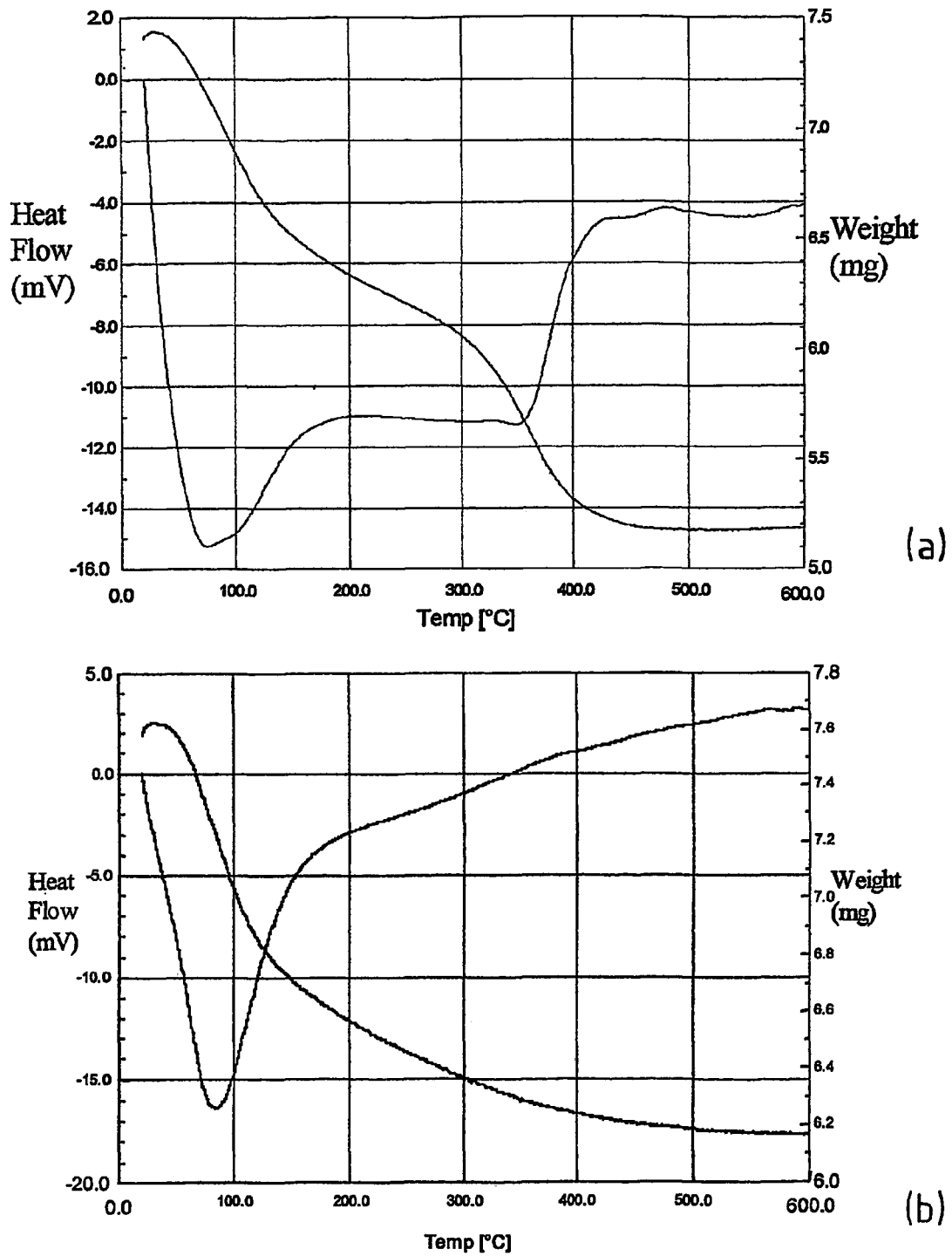
Figure 9:
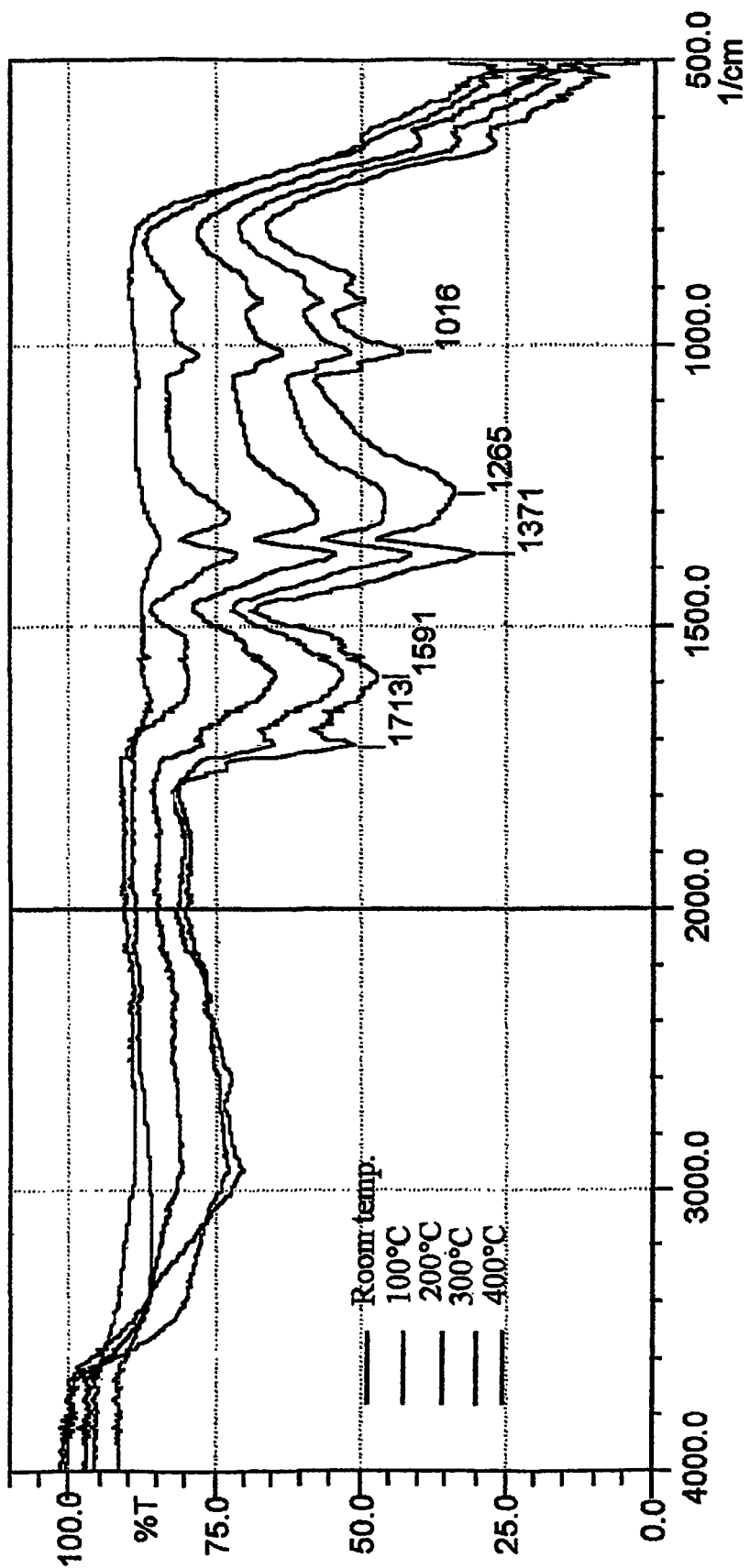

FIG. 6 illustrates powder diffraction patterns of hydrous insoluble tin oxide (lower) and soluble tin oxide (upper).
FIG. 7 illustrates powder diffraction patterns of hydrous insoluble tin oxide (a) and soluble tin oxide (b) at temperatures of 200° C., 400° C., 600° C., 800° C. and 900° C. (Temperatures increase from bottom to top.)
FIG. 8 illustrates thermograms of hydrous insoluble tin oxide (b) and soluble tin oxide (a).
FIG. 9 illustrates the infrared spectra of soluble tin oxide.

According to FIG. 1 there is provided a process outline for the production of a soluble metal oxide.

In step 101 hydrous insoluble metal oxide is obtained and is dried at room temperature until it crumbles into a powder in step 102. In step 103, an amount of the dried hydrous metal oxide is added to an amount of organic acid to form a metal oxide suspension. In step 104 the metal oxide suspension is heated until the suspension forms a solution. The solution is filtered to remove any undissolved material in step 105. In step 106, the organic acid is removed to provide the soluble metal oxide in step 107.

Any amount of the hydrous insoluble metal oxide can be added to the organic acid as long as there is sufficient acid present for a solution to form during heating. Obviously filtering is an optional step which is only carried out if necessary. It will be appreciated that the acid removal step can be omitted and the resultant solution can be used in this form.

The hydrous metal oxide may be obtained commercially and can also be prepared by hydrolysis of a metal tetrachloride OR metal alkoxide or by any other preparative method. A typical process for the preparation of hydrous tin by hydrolysis of tin, tetrachloride is as follows. 20 cm³ of tin tetrachloride was added to 200 cm³ of water to give a highly acidic solution. The pH of this solution was slowly raised to 6 after which the hydrous tin oxide was removed by centrifuging the solution. The very fine white solid was washed 8 times with distilled water to effect the total removal of chloride. Following a final washing with acetone, to speed the drying process the solid was left to dry in the open atmosphere at room temperature. Approximately 10.5 g. of dry hydrous tin oxide was obtained by this process. This hydrous oxide is insoluble in all organic solvents and in water.

According to FIG. 2 there is provided a process outline for the modification of the solubility of a soluble metal oxide.

In step 201 the soluble metal oxide is heated to a temperature not greater than 300° C. until it becomes insoluble in step 202. In step 203 an amount of the insoluble metal oxide is added to an amount of organic acid to form a metal oxide suspension in step 204. The metal oxide suspension is heated until the suspension forms a solution in step 205. In step 206 the acid is removed to provide a soluble metal oxide of modified solubility in step 207. The amounts of insoluble metal oxide and acid required are determined as above.

According to FIG. 3 there is provided an alternative process outline for the modification of the solubility of a soluble metal oxide.

In step 301 an amount of soluble metal oxide is added to an amount of organic solvent in step 302 to form a solution in step 303. In step 304 acid is added dropwise to the solution and the solvent is removed from the solution in step 305 to provide a soluble metal oxide in step 306.

It should be noted that instead of adding aid to the metal oxide suspension that alternatively a non-acid which is capable of hydrogen bonding could be added. For example, the acid could be substituted for 8-hydroxyquinoline and in this case the resultant soluble metal oxide would be soluble in methanol.

According to FIG. 4 there is provided a process outline for the preparation of a soluble mixed metal oxide.

In step 401 a soluble metal oxide is obtained by the process as outlined in FIG. 1. In step 402 the metal oxide is dissolved in a solvent to provide a solution in step 403. In step 404 an additional metal is added to the solution. The solution is filtered in step 405. The solvent is removed from the solution in step 406 to provide a soluble mixed metal oxide in step 407.

It will be appreciated that instead of dissolving the metal oxide in a solvent to provide a solution it is further possible to use the solution obtained in FIG. 1. Optionally the solution can be heated before it is filtered.

According to FIG. 5 there is provided a process outline for the extraction of tin from a mixed tin, antimony and iron ore.

In step 501 a mixed ore is obtained and is dissolved in a mineral acid in step 502 to provide a mineral acid solution in step 503. In step 504 the pH of the solution is increased to precipitate hydrous tin, antimony and iron oxides from the solution. In step 505 an amount of organic acid is added to the hydrous oxides to form an organic acid suspension in step 506. The suspension is heated in step 507. In step 508 the suspension is filtered. In step 509 the organic acid is removed to provide a soluble tin oxide with iron residue in step 510. The iron residue can be removed downstream by dissolving the soluble tin oxide and iron residue in an organic solvent to provide a solution, maintaining in solution for at least a day, filtering the solution to remove the iron residue and removing a soluble tin oxide.

The amount of organic and added should beg sufficient to allow a solution to form during heating.

EXAMPLE 1

Preparation of a Soluble Tin Oxide Using Acetic Acid

Preparation

Insoluble hydrous tin oxide was obtained and dried at room temperature until the tin oxide crumbled into a powder. 10.5 g of the dried insoluble hydrous tin oxide was added to 100 cm³ of glacial acetic acid to; provide a tin oxide suspension. The suspension was stirred for one hour at room temperature. No apparent dissolution of the insoluble tin oxide was noted. The tin oxide suspension was heated to a temperature of approximately 85° C. and at this temperature the oxide was slowly consumed into the solution. When the temperature approached 100° C. the solids had completely disappeared giving a clear solution. Heating was discontinued and the solution was filtered. The acetic acid was removed using a suitable evaporating apparatus such as a Rotavap™ at a pressure of 17 mm.Hg provided by a water pump. The remaining white solid was the soluble tin oxide.

Analysis

Analysis of the soluble tin oxide showed that it had a carbon content of approximately 9% to 10% and an acetate content in the region of between 22% and 24%. The carbon content was measured using a carbon nitrogen, hydrogen analyser and the amount of carbon correlates to the amount of acetate present.

The soluble tin oxide was found to be soluble in cold glacial acetic acid and cold methanol. It was found that approximately 1000 g of soluble tin oxide could be dissolved in 1 liter of methanol at room temperature to give a clear transparent solution. The soluble tin oxide was also found to have some solubility in ethanol and water.

X-Ray Powder Diffractometry Studies

Powder diffraction patterns of hydrous insoluble tin oxide and soluble tin oxide are shown in FIG. 6. The patterns are essential identical. The average particle size of the insoluble tin oxide and soluble tin oxide was calculated to be 19 Å.

Samples of both insoluble tin oxide and soluble tin oxide were heated to temperatures of 200° C., 400° C., 600° C., 800° C. and 900° C. At each of these temperatures powder diffraction patterns and infrared spectra were recorded. The diffraction patterns are indicated in FIG. 7. As the temperature was raised sintering occurred (i.e. an increase in particle size with increasing temperature) to give large crystallites, this is indicated, by a narrowing of the diffraction lines. Sintering also results in the loss of water molecules and is due to the reaction denoted by the following formula:

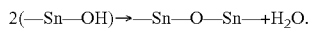

$$2(\text{—Sn—OH}) \rightarrow \text{—Sn—O—Sn—} + H_2O.$$

The response of the oxides to heating was found, to be essentially identical except at 400° C. where the diffraction lines of soluble tin oxide were found to be broader than those of insoluble tin oxide, thus indicating that at this temperature a slight retardation of the sintering process occurs as a result of the presence of the acetate groups.

Thermogravimetric Analysis

A number of soluble tin oxide samples were prepared at above and thermograms for each of the samples were recorded. These thermograms showed consistency both in terms of thermogram form and in terms of quantitative weight losses over the temperature range. Typical thermograms of both insoluble tin oxide and soluble tin oxide are shown in FIG. 8. The thermogram for insoluble tin oxide is typical to that recorded by many authors and shows the greatest weight loss occurring up to a temperature of approximately 120° C. and tailing off with increasing temperature beyond this point. In contrast, the thermogram for the soluble tin oxide shows three well defined areas of weight loss in each of which there is a linear relationship between the weight loss and temperature. There was found to be a steep weight loss with increasing temperature in the range 25-120° C. and this was followed by a tailing off into a second region extending to approximately 300° C. The slope of the line in this region is very much less than that in the lower temperature region. Finally, a further marked increase in weight loss with increasing temperature occurred in the approximate region 300-450° C. No further significant weight loss beyond this point was recorded.

Weight loss up to 300° C. is largely associated with loss of hydrogen bound acetic acid while weight loss in the region of 300 to 400° C. is associated with loss of acetate bound to tin atoms on the surfaces of crystallites. Tin acetates, in which acetate is coordinated to tin, show acetate weight loss in this area and thus it can be assumed that for soluble tin oxide this is also weight loss due to acetate bonded to tin, an assumption which is supported by infrared data.

Infrared Spectra

The infrared spectra of soluble tin oxide are indicated in FIG. 9. The infrared spectra of soluble tin oxide at room temperature show a very broad absorption in the region. 1,450-1,650 cm$^{-1}$: This is a general region where the acetate $\upsilon(C-O)_{asym.}$ is observed. A broad intense absorption occurs at approximately 1265 cm$^{-1}$ and a much sharper absorption at 1371 cm$^{-1}$, both of which are attributable to the acetate $\upsilon(C-O)_{sym}$ related vibrations. A sharp band is observed at 1713 cm$^{-1}$. It has been found that this band results from acetic acid forming a hydrogen bond to acetate bonded to tin. Significantly, the band diminishes with increasing temperature and samples heated to 300° C. no longer display this band. This is consistent with the thermogravimetric studies which indicate that the loss of weight up to 300° C. is associated with acetate not bound directly to tin. The absorption in the region 1450-1650 cm.$^{-1}$ of the spectrum of the sample heated to 300° C. must result from acetate bonded to tin. The broadness of the absorption points to the presence of more than one type of tin bound acetate and this is further supported by the presence of bands at approximately 1265 and 1371 cm$^{-1}$.

When acetate is bonded to tin through one of its oxygen atoms (i.e. unidentate acetate) as, for example, in $K_2[Sn(acetate)_6]$ $\upsilon(C-O)_{asym}$ is observed in the approximate region 1630-1675 cm$^{-1}$ region while $\upsilon(C-O)_{sym}$ is observed above 1300-1340 cm$^{-1}$ region. On the other hand, when acetate is bonded through both its oxygen atoms (i.e. bidentate acetate), $\upsilon(C-O)_{asym}$ is observed close to 1560 cm$^{-1}$, while $\upsilon(C-O)_{sym}$ is observed at a frequency close to 1400 cm.$^{-1}$. Thus, the spectrum of soluble tin oxide that has been heated, to 300° C. shows the presence of both unidentate and bidentate acetates bonded to tin.

The reaction of the components in the above process can be further illustrated by the following reaction scheme:

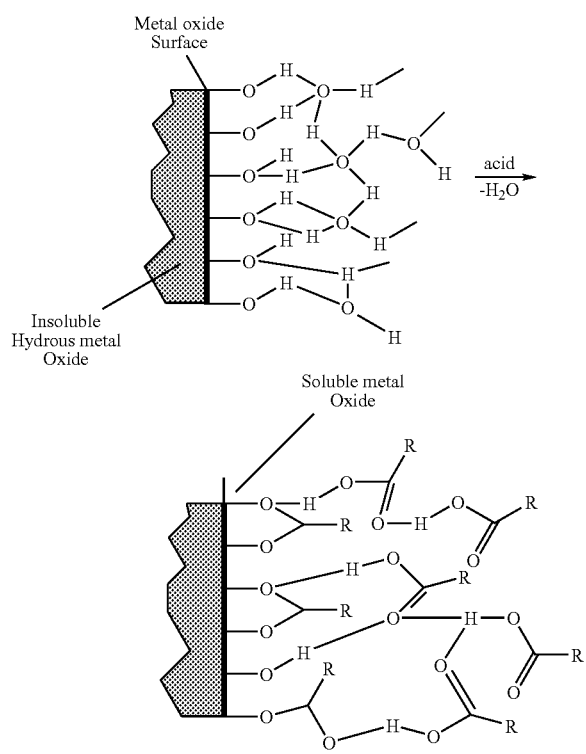

As shown from the above reaction mechanism, the insoluble hydrous metal oxide comprises a number of hydroxyl groups and surface bound water. Addition of the hydrous metal oxide to an organic acid and heating the resultant suspension results in the soluble metal oxide. The soluble metal oxide essentially has the same core as the insoluble metal oxide with the exception that a number of inner and outer organic binding groups have been attached to the metal oxide conferring solubility to the metal oxide.

A Theoretical Model of a Solubilised Tin Oxide Crystallite

The data from thermal, diffraction and spectroscopic data wan be combined to give a good model of a soluble tin oxide crystallite. Tin oxide crystallises in the tetragonal system with the unit cell parameters a=4.737 Å and b=3.186 Å while x-ray diffraction data point consistently to an average particle size of approximately 19 Å in the case of the soluble tin oxide. Bearing these facts in mind, three model crystallites were developed. This was achieved, in each case, by choosing a unit of structure, a building block, which would have the desired bounding faces of the model crystallite. One building block was the conventional tetragonal unit cell of rutile (tin oxide adopts the rutile structure) while the other two were alternative monoclinic and triclinic cells. The model crystallite was built from a three dimensional assembly of the building blocks such as to give the desired average crystallite size of approximately 19 Å important data resulting from the models are in Table 1.

TABLE 1

Data for Idealised Crystallite Particles

| Average Crystallite Size (Å) | Crystallite Faces | Ratio of Total Tin To Surface Tin | Percent of Surface Tins with Covalently Bound Acetate |
|---|---|---|---|
| 19.81 | (1, 0, 0), (0, 1, 0), (0, 0, 1) | 2.24 | 86 |
| 19.68 | (1, 0, 0,), (0, 1, 0), (1, 0, 1) | 1.90 | 73 |
| 20.3 | (1, 0, 0), (1, 1, 0), (1, 0, 1) | 1.78 | 68 |

The data in the final column were calculated based on the fact that the final weight loss in the thermograms is almost entirely resulting from loss of acetate covalently bound to surface tins. In actual fact, none of the models can be considered as perfect models for the crystallites. However, based on the known morphology of tin oxide crystallites it can be argued convincingly that the percentage of surface tins with covalently bonded acetate must be somewhat greater than 68% but is unlikely to be as great as 75%. Furthermore, it can be confidently estimated that the total hydrogen bonded water accounts for less than 5% of the total weight loss on heating to 600° C.

EXAMPLE 2

Preparation of the Soluble Tin Oxide Using Acetic Acid—Comparison Between Modified Additions of Hydrous Tin Oxide and Acid Preparation The process as outlined in Example 1 was repeated with the following changes: 55 g of hydrous oxide and 200 cm$_3$ of acetic acid were employed. Otherwise the procedure was identical to that described in Example 1.

Analysis

The carbon content and acetate content were found to be in the same region as the results obtained in example 1. Further analysis showed that greater and lesser quantities of hydrous tin oxide yield substantially the same results as long as there is sufficient acetic acid present to allow a solution to be formed during heating. The x-ray powder diffractometry studies, thermogravimetric analysis and infrared spectra showed similar results to those obtained in Example 1.

EXAMPLE 3

Preparation of Soluble Tin Oxide Using an Acetic Acid/Water Mix Solvent

Preparation

Insoluble hydrous tin oxide was obtained and dried at room temperature as described previously. 10.5 g of the dried insoluble hydrous tin oxide was added to a 100 cm³ 90%/10% by volume glacial acetic acid/water mixed solvent (90 cm³ glacial acetic acid/10 cm³ water) to provide a tin oxide suspension. The suspension was stirred for one hour at room temperature and was heated to approximately 85° C. as outlined previously. The solution was filtered and the acetic acid/water mixed solvent was evaporated from the solution to provide the soluble tin oxide in the form of a white solid.

Analysis

Analysis of this soluble tin oxide indicated that it had a lower carbon content than the soluble tin oxide of Example 1 and was in the region of between 7.5% and 8.5%.

The soluble tin oxide was also found to be soluble in cold glacial acetic acid and cold methanol however its solubility in methanol was found to be less than the soluble tin oxide from Example 1.

The further effect of adding water to the solvent was ascertained by preparing a mixed solvent comprising 85% glacial acetic acid by volume and 15% water by volume and repeating the procedure above. Soluble tin oxide was not obtained.

EXAMPLE 4

Preparation of a Soluble Tin Oxide Using Trifluoroacetic Acid Preparation

Insoluble hydrous tin oxide was obtained and dried at room temperature as described previously. 5 g of the dried insoluble hydrous tin oxide was added to 10 cm³ of trifluoroacetic acid to provide a tin oxide suspension. The suspension was heated to 70° C. and it was noted that the hydrous tin oxide was completely dissolved to give a clear solution. The trifluoroacetic acid was removed on a Rotovap™ to leave a white powder of the soluble tin oxide.

Analysis

The carbon content of the soluble tin oxide was found to be in the range 6% to 6.5%, and the soluble tin oxide was found to have a fluoroacetate content in the range 28.26% to 30.61%.

Solubility

The soluble tin oxide was found to be soluble in methanol, acetone and tetrahydrofuran. For example, the solubility in both acetone and tetrahydrofuran was found to be greater than 1000 g per liter of solvent. The solubility in both acetone and tetrahydrofuran is retained after heating the soluble oxide to 250° C.

X-Ray Powder Diffractometry

The room temperature powder diffraction pattern is identical to that of the soluble tin oxide of Example 1 and particle size, as measured from line width analysis, indicate average particle size of approximately 19 Å. In other words, average particle size is similar to that for the soluble tin oxide which was prepared using acetic acid. Studies of diffraction data for samples heated to various temperatures up to 900° C. indicated that while particle size increases with increasing temperature (sintering process), this increase is not as great as for soluble tin oxide prepared from the acetic acid process.

Infrared Spectroscopy

Where bands associated with $\upsilon(C{-}O)_{asym.}$ occur in the region 1600-1750 cm.$^{-1}$, the spectrum of soluble tin oxide exhibits a broad absorption centred at 1696 cm.$^{-1}$. However, this band has a number of very well defined shoulders to higher and lower frequencies thus indicating different roles of the trifluoroacetate groups. When the sample is heated to 300° C., all but those trifluoroacetate groups which are bound to the tin are removed and the infrared spectrum of this heated sample shows a less complicated spectrum in the 1600-1750 cm.$^{-1}$ range; two broad overlapping peaks centered at 1640, and 1672 cm.$^{-1}$. In the 1400 cm.$^{-1}$ region where bands associated with $\upsilon(C{-}O)_{sym.}$ occur, a broad weak absorption occurs. The broadness of this band suggests the presence of more than one band. Likewise, two strong bands associated with $CF_3$ rocking occur at 1199 and 1152 cm.$^{-1}$. Thus, the infrared data point to two types of trifluoroacetate bound directly to tin as is the case for acetate in soluble tin oxide obtained from the acetic acid process.

Further Analysis

The effect of adding water to the trifluoroacetic acid to provide a trifluoroacetic acid/water mixed solvent was ascertained. The mix solvent comprised 50% trifluoroactic acid by volume and 50% water by volume (5 cm³ each respectively) and the procedure was carried out as outlined above. The tin oxide precipitated was found to be insoluble.

Further analysis has also indicated that in the case of this example with the use of trifluoroacetic acid that removal of the outer fluoroacetate group will result in retained solubility of the tin oxide. This is due to the presence of exposed fluorine atoms on the surface of the metal oxide which allow solubility of the metal oxide.

EXAMPLE 5

Preparation of a Soluble Tin Oxide Using Propanoic Acid Preparation

The method of preparation of the soluble tin oxide is directly analogous to that for the process for preparation using acetic acid (Example 1), except that acetic acid is replaced with propanoic acid, Analysis Analysis of the soluble tin oxide confirmed the presence of propanoic acid groups.

The carbon content was found to be in the range in the range 12-13% and the soluble tin oxide was found to have a propionate content in the range 24.35% to 26.38%. When this form of soluble tin oxide is heated under vacuum for one hour at 100° C., the carbon content reduced to approximately 10.5%, and the propionate content reduced to 21.3%.

Solubility

Soluble tin oxide prepared by this process was found to be soluble in tetrahydrofuran, methanol and in dimethyl-formamide. It was also found to have some solubility in pyridine. Samples heated to 100° C. under vacuum retained their solubility.

Thermogravimetric Data

Thermograms of this form of soluble tin oxide bear all the characteristics of those of soluble tin oxides prepared using acetic acid.

Powder Diffractometry

The powder diffraction pattern of this form of soluble tin oxide is identical to that of the soluble tin oxides prepared using acetic acid revealing a particle size of approximately 19 Å. In the sintering process the powder diffraction patterns reveal that this form of soluble tin oxide behaves essentially identically to the soluble tin oxides prepared using acetic acid Infrared Spectra In the important regions 1500-1750 cm.$^{-1}$ and 1300-1450 cm.$^{-1}$ the spectra are better defined than those for the soluble tin oxides prepared using acetic acid. Two bands at 1564 and 1623 cm.$^{-1}$ are attributable to $\upsilon(C-O)_{asym}$, while a band at 1376 cm.$^{-1}$ and at approximately 1420 cm.$^{-1}$ appearing as a clearly defined shoulder are attributable to $\upsilon(C-O)_{sym}$. These bands are consistent with the presence of monodentate and bidentate propionate groups bound to tin. A sharp band appearing at 1716 cm.$^{-1}$ is attributable to hydrogen bonded propanoic acid molecules. Thus, on the basis of both the thermogravimetric and infrared data, it would appear that the roles of propionate parallel those of acetate in the soluble tin oxides prepared using acetic acid.

EXAMPLE 6

Preparation of a Soluble Titanium Oxide Using Acetic Acid

Preparation

Insoluble hydrous titanium oxide was obtained and dried at room temperature until it crumbled into a powder. 6 g of the dried insoluble hydrous titanium oxide was added to 200 cm$^3$ of glacial acetic acid to provide a titanium oxide suspension. The suspension was heated to the boiling point of glacial acetic acid at a temperature in the region of 119° C. and maintained at this temperature for 3 hours. The titanium oxide did not dissolve and was subsequently removed by filtration and dried in air. The remaining acetic acid filtrate was removed using a Rotovap™ to leave a small quantity of white solid. The X-ray powder diffraction pattern of this white solid indicated that it is not titanium oxide. This insoluble titanium oxide/acetate material was added to glacial acetic acid and the suspension was maintained at reflux temperature for 3 hours. The insoluble titanium oxide was isolated by filtration and dried in air. The acetic acid filtrate in this case was found not to contain any dissolved material.

The insoluble titanium oxide from the above process was added to 200 cm$^3$ methanol and a large excess of 8-hydroxyquinoline was added. A yellow colour immediately was observed in the solution and the undissolved solid also assumed a yellow colour. After refluxing for 4 hours the solution had assumed a deep yellow colour, as also had the undissolved material. The solution was filtered and the methanol of the filtrate was removed on a Rotovap to leave a yellow powder. This powder was repeatedly washed with diethylether and finally allowed to dry at room temperature. An infrared spectrum of this yellow material confirmed the presence of bound 8-hydroxyquinoline and the absence of unreacted 8-hydroxyquinoline. An X-ray powder diffraction pattern of the material confirmed that it was a titanium oxide. This form of titanium oxide was found to be highly soluble in methanol. Solubility is retained, albeit reduced, in samples heated to 300° C. The soluble oxide sintering process was monitored by X-ray diffraction. It parallels the behaviour of hydrous titanium oxide and in the sintering process the yellow colour changes to a red colour and finally the material becomes colourless at 800° C.

Analysis

Analysis of the soluble titanium oxide showed that it had a carbon content of approximately 8%.

EXAMPLE 7

Preparation of Soluble Titanium Oxide Using Trifluoroacetic Acid

Insoluble hydrous titanium oxide was obtained and dried at room temperature until it crumbled Into a powder. 1 g of the insoluble hydrous titanium oxide was added to cm$^3$ of trifluoroacetic acid. The resulting suspension was heated to 70° C., at which temperature the titanium oxide had completely dissolved to give a clear colourless solution. The trifluoroacetic acid as described previously was removed to yield a soluble titanium oxide as a white powder.

Analysis

The carbon content of the soluble titanium oxide was 10% thus indicating a fluoroacetate content of 47%.

Solubility

The soluble titanium oxide had excellent solubility in acetone and tetrahydrofuran. (greater than 1500 g per, liter in each solvent). This solubility is retained after the oxide is heated to 250° C. Solubility is also good In methanol but precipitation tends to occur after 24 hours (sometimes less).

X-Ray Power Diffractometry

The powder diffraction pattern of the soluble titanium oxide clearly Indicated that the core structure of the Initial hydrous oxide was retained (showing the presence of anatase and brookite phases) following reaction in trifluoroacetic acid. The powder diffraction pattern of a sample of soluble titanium oxide heated to 300° C. indicated increased anatase over the brookite phase and a sample heated to 400° C. gave a powder diffraction pattern indicating total transformation to the anatase phase. The powder diffraction patterns showed a growth in anatase particle size as the temperature was raised to 700° C. However, at this temperature the rutile phase was clearly manifest. The rutile phase become increasing dominant as the temperature was raised to 900° C., at which temperature the anatase phase was a minor component. In overall terms, the soluble titanium oxide behaved similarly to the insoluble hydrous titanium oxide as a result of the heating process.

Thermogravimetric Analysis

A thermogram of the soluble titanium oxide showed the same general features as those found for soluble tin oxide. The most significant difference between the thermograms is that the final steep weight loss which began at approximately 300° C. in the case of soluble tin oxide (derived from, acetic acid) began at approximately 250° C. in the case of the soluble titanium oxide.

Infrared Spectroscopy

Analysis of the infrared spectra of samples of soluble titanium oxide recorded for samples which had been maintained at room temperature and for samples heated to temperatures up to 400° C. established the same multiple roles for the hydrogen bonded trifluoroacetic acid and trifluoroacetate covalently bound to titanium as those for the hydrogen bonded acetic acid and covalently bound acetate in the case of soluble tin oxide derived from acetic acid.

As with the other organic binding groups further analysis was carried out to examine the solubility of the metal oxides and in this case titanium oxide when the outer layer of fluoroacetate groups were removed. In contrast to the results shown for the other types of organic binding groups In the case of fluoroacetate groups when the outer organic binding group is removed, the resultant metal oxide with inner fluoroacete groups bound was shown to retain its solubility. This was found to be true for both tin and titanium oxides. Further analysis indicated that even when the outer fluoroacetate groups are removed that the Inner fluoroacetate groups remain bonded to the titanium oxide by covalent bonds. The retention of solubility even after the outer fluoroacetate groups are removed is thought to be associated with the presence of exposed fluorine atoms which are known to confer abnormal solubility. This would infer that solubility is dependent on the type of atoms and molecules attached and it is considered that any atom or molecule with unusual solubilities would have the same effect. Additionally, instead of using trifluoroacetic to provide the fluoroacetate groups, another fluoroacetate providing acid could be used such as monofluoroacetic acid. In this case, it is expected that the resultant soluble titanium oxide would have less fluoroacetate groups bound thereto but would still be soluble.

Therefore, if the acid is a fluorine containing carboxylic acid, (e.g. trifluoroacetic acid) the soluble oxide will have carboxylate groups directly attached to the metal. Providing there is a sufficient number of carboxylate groups attached to surface metal atoms, the oxide can be soluble as a result of the presence of the exposed fluorine atoms. When this level of surface attachment of carboxylate is achieved, further hydrogen-bonded layers can be added which may result in retention of the type of solubility achieved by the presence of the surface carboxylate groups alone. However, these hydrogen-bonded layers may alter the nature of the solubility.

On the other hand, if the acid is a non-fluorine containing acid (e.g. acetic acid or propionic acid) the soluble oxide has carboxylate groups directly bound to surface metal atoms and further layers of hydrogen bonded acid are built unto the carboxylate/hydroxy surface thus generated. The inner carboxylate/hydroxy layer not a sufficient condition for solubility. The outer hydrogen bonded layers confer solubility and both the type and degree of solubility is dictated by the nature of the molecules existing in these hydrogen-bonded layers. These latter molecules are not necessarily acid molecules. However, in order to have the necessary outer hydrogen-bonded layers (to confer solubility) an appropriate number of carboxylate groups must be directly attached to the surface metal atoms.

EXAMPLE 8

Control of Solubility of the Metal Oxide by Surface Group Removal and Replacement As outlined above, the acid used determines the organic binding groups. Thus when acetic acid is used the outer organic binding group is an acetate, when trifluoroacetic acid is used the outer organic binding group is a fluoroacetate group, and when propanoic acid is used, the outer organic binding group is a propionate group. As discussed in the previous examples the different organic binding groups confer different levels of solubility to the metal oxide in different solvents.

It is further possible to modify the type of solubility of each soluble metal oxide.

(a). Modification of Acetate Bound Soluble Tin Oxide to Provide Fluoroacetate Bound Soluble Tin Oxide Soluble tin oxide having acetate groups as organic binding groups was prepared as in Example 1.2 g of the soluble tin oxide was heated to 300° C., at which temperature it became insoluble. The Insoluble tin oxide was added to 10 cm$^3$ trifluoroacetic acid and the suspension was heated to 100° C. After 10 minutes at this temperature, the previously suspended material was totally dissolved to give a clear solution. The trifluoroacetic acid was removed by a Rotovap™ to give a soluble tin oxide that now had solubility in methanol, tetrahydrofuran and acetone. In other words, the resultant soluble tin oxide mow behaved like soluble tin oxide prepared using trifluoroacetic acid.

(b) Modification of fluoroacetate bound soluble tin oxide to provide acetate bound soluble tin oxide 2 g of soluble tin oxide having fluoroacetate groups as organic binding groups was prepared as in Example 4 and was heated to 300° C. at which temperature it became Insoluble. The insoluble tin oxide was added to 50 cm$^3$ acetic add and the suspension was heated to 100° C. After 10 minutes at this temperature, the material was totally dissolved to give a clear solution. The acetic acid was removed by a Rotovap™ to give a soluble tin oxide that was soluble In methanol but not tetrahydrofuran or acetone. In other words, the resultant soluble tin oxide had the solubility characteristics of soluble tin oxide prepared using acetic acid. The infrared spectrum of this material show that trifluoroacetate groups remain bonded to tin.

(c) Modification of Acetate Bound Soluble Tin Oxide to Provide Propionate Bound Soluble Tin Oxide 2 g of soluble tin oxide having acetate groups as organic binding groups was prepared as in Example 1 and was heated to 30° C. at which temperature it now became insoluble. The insoluble tin oxide was added to 56 cm$^3$ propanoic acid and the suspension was heated to 120° C. After 10 minutes at this temperature, the material was totally dissolved to give a clear solution. The propanoic acid was removed using a Rotovap™ to give a soluble tin oxide that was soluble in methanol, tetrahydrofuran and acetone. In other words, the resultant soluble tin oxide now had the solubility characteristics of soluble tin oxide prepared using propanoic acid.

(d) Modification of Acetate Bound Soluble Tin Oxide to Provide Phosphate Bound Soluble Tin Oxide 2 g of soluble tin oxide having acetate groups as organic binding groups was prepared as in Example 1 and dissolved in 30 cm$^3$ of methanol. Concentrated phosphoric acid was slowly added at room temperature and the resulting solution stirred at room temperature for 10 minutes. The molar quantity of phosphoric acid was confined to be in the region of 100$^{th}$ of the molar quantity of tin present The methanol was removed on a Rotovap™ to leave a colourless material. The infrared spectrum of this material confirmed the presence of both acetate and phosphate; not free phosphoric acid. An X-ray powder diffraction of the material confirmed the retention of the tin oxide rutile structure. This material had excellent solubility in methanol (similar to that of the soluble tin oxide prepared using acetic acid) but furthermore, it also had excellent solubility in water. The phosphate-modified material gave perfectly stable aqueous solutions.

(e) Modification of Acetate Bound Soluble Tin Oxide to Provide Phenylphosphonate Bound Soluble Tin Oxide.

2 g of soluble tin oxide having acetate groups as organic binding groups was prepared as in example 1 and was dissolved in 40 cm$^3$ of methanol. Phenylphosphonic acid dissolved in 10 cm$^3$ methanol was added dropwise to the soluble tin oxide—methanol solution over a period of 10 minutes (the tin:phenylphosphonic acid molar ratio was 10:1). After stirring for a half hour at room temperature, the methanol was removed by a Rotovap™. The remaining white solid was repeatedly washed with acetone to remove unreacted phenylphosphonic acid. The infrared spectrum of the washed white material showed the presence of both phenylphosphonate and acetate and further confirmed the absence of unreacted phenylphosphonic acid. A powder diffraction pattern confirmed the retention of the tin oxide rutile structure. This form of soluble tin oxide has very good solubility in methanol.

(f) Modification of Acetate Bound Soluble Tin Oxide to Provide 8-Hydroxyqouinoline Bound Soluble Tin Oxide 2 g soluble tin oxide having acetate groups as organic binding groups was prepared as in Example 1 and was dissolved in 100 cm$^3$ of methanol. Solid 8-hydroxyquinoline was added in large excess to give a bright yellow solution. After stirring for a half hour at room temperature, the methanol was removed by a Rotovap™. The remaining yellow solid was repeatedly washed with diethylether to remove unreacted 8-hydroxyquinoline. The diethylether contained unreacted 8-hydroxyquinoline. The infrared spectrum of the washed yellow, material showed the presence of both bound 8-hydroxyquinoline and acetate and further confirmed the absence of unreacted 8-hydroxyquinoline, A powder diffraction pattern confirmed the retention of the tin oxide rutile structure. This form of yellow soluble tin oxide has very good solubility in methanol.

(g) Modification of Acetate Bound Soluble Tin Oxide to Provide Polyethylene Glycol 4000 Bound Soluble Tin Oxide.

0.75 g of soluble tin oxide having acetate groups as outer organic binding groups was prepared as in Example 1 and was dissolved in 25 cm$^3$ of methanol to provide a solution. To the solution of soluble tin oxide in methanol was added an amount of the solid polyethylene glycol such that the tin/polyethylene glycol molar ration was 1/1. The solution was refluxed for two hours, after which time the solvent was removed on a rotovap. This yielded an oily material which was found to be not only soluble in methanol, but also extremely soluble in tetrahydrofuran. An infrared spectrum of the oily material confirmed that the polyethylene glycol was bound to the tin oxide crystallites.

Rather surprisingly, the tetrahydrofuran soluble tin oxide was not generated by the attempted reaction of the soluble tin oxide with the polyethylene glycol in tetrahydrofuran.

EXAMPLE 9

Formation of Soluble Mixed Metal (Doped) Oxides

The soluble tin and titanium oxides, when in solution, react readily with metal powders in a redox reaction which results in the reduction of the oxidation state of metal sites within the oxide and the incorporation of metal ions from the metal that has undergone oxidation. This is readily done without loss of solubility. The metal powder used in the redox reaction can be the same as the metal of the metal oxide but alternatively it can be a different metal.

a) 0.7 g of soluble titanium oxide following trifluoroacetic acid treatment (i.e. prepared by the process of example 7) was heated to 200° C. for two hours in order to reduce the quantity of hydrogen-bonded trifluoroacetic acid. The oxide was subsequently dissolved in 50 cm$^3$ acetone. Approximately 1.0 g of Indium metal powder was added and the acetone was refluxed for approximate two hours. Over this period the colourless solution of the titanium oxide underwent colour changes to yellow, turquoise and finally a deep sky blue. At this stage the remaining indium, which had fused into a solid shiny lump, and was removed. When the solution was exposed to air, the blue colour rapidly faded to yield a pale yellow colour (resulting, to an extent, to the presence of the Indium ions chemically attached to the titanium oxide surface). When the experiment was carried out in a nitrogen atmosphere, the blue colour of the solution was retained and a bluish green solid isolated following removal of solvent by distillation. This coloured oxide retained excellent solubility and gave a powder diffraction pattern that confirmed the retention of the titanium oxide structure.

b) Identical experiments to that in (a) were carried out, using tin and zinc powders in place of indium, resulting in the formation of bluish green solutions. The coloured oxides recovered from these redox reactions retained their solubilities and also retained the titanium oxide structure.

c) A 0.75 g sample of soluble tin oxide from the acetic acid treatment (as prepared by the process of example 1) were heated to 120° C. for two hours, after which time it was dissolved in 60 cm$^3$ methanol. Approximately 1.0 g of indium metal powder was added and the methanol brought to reflux temperature for two hours. Over this period a deep yellow colour developed in what had been a colourless tin oxide solution indicating the presence of Indium ions in the oxide lattice. After removal of the excess indium the methanol was removed on a rotovap to leave a yellow solid. This solid retained the solubility and rutile structure of the original tin oxide.

d) Identical experiments to that in (c) using tin, antimony and zinc powders, also yielded yellow solids (orange yellow in the case of the product obtained from reaction of tin oxide with tin metal). The yellow doped tin oxides retained the solubility and ruffle structure of the original in oxide, e) Identical experiments to that in (c) using manganese and cobalt metals yielded golden brown and deep purple solutions respectively, from which deep brown and purple tin oxide products respectively were recovered. These doped mixed metal oxide samples also retained the solubility and rutile structure of the original tin oxide.

f) 0.75 g of soluble tin oxide from trifluoroacetic acid treatment were dissolved in 50 cm$^3$ tetrahydrofuran. After adding approximately 1.0 g manganese powder, the tetrahydrofuran solution was brought to reflux temperature for two hours. Even before reflux temperature was attained, the colourless solution had acquired a brown orange colour and after two hours refluxing the colour had considerably intensified to a rich red brown solid. After filtering the rich red brown solutions to remove unreacted manganese followed by removal of the solid under reduced pressure a brown solid was obtained. An x-ray powder diffraction pattern of the brown solid confirmed that it had the rutile tin oxide structure. The doped oxide retained the original solubility in acetone, tetrahydrofuran and methano and furthermore, very good solubility was extended to diethyl ether and ethyl acetate.

EXAMPLE 10

Extraction of Tin from a Mixed Tin Antimony and Iron Ore

A mixture of the hydrous oxides of tin, iron and antimony were obtained by dissolving an ore in a mineral acid to form a mineral acid solution comprising aqueous tin, antimony and iron species. The pH of the solution was increased to form hydrous tin, antimony and iron oxides within the solution and to precipitate the hydrous tin, antimony and iron oxides from solution. A mixture of the hydrous oxides of tin, antimony and iron was added to excess acetic acid and the mixture brought to reflux temperature for three hours. After this time the solution was cooled to room temperature and filtered. This removed the hydrous antimony oxide completely along with a large proportion of the iron oxide. The filtrate was reduced to dryness to give a solid that was dissolved in methanol. The solution was allowed stand for more than 24 hours. At this time a red precipitate had formed and the solution was colourless. The red solid was removed by filtration and the solvent removed to yield the soluble tin oxide.

EXAMPLE 11

Soluble Tin Oxide Acting as a Homogenous Catalyst: Tin Oxide Catalysed Urethane Formation A reaction between phenyl isocyanate and butanol was followed by monitoring the loss of intensity of the isocyanate $v_{nco}$ band at 2261 cm$^{-1}$ in the infrared spectrum of phenyl isocyanate (see R. P. Houghton and A. W. Mulvaney, *J. Organometal. Chem.*, 1996, 518, 21). Three separate tetrehydafuran solutions A, B, and C were prepared. A and B contained equimolar quantities of phenyl isocyanate and methanol. In addition, A also contained a catalytic quantity of soluble tin oxide prepared as In example 4, solution C contained isocyanate and soluble tin oxide prepared as In example 4. All three solutions were heated to 40° C. for one hour. At the end of this period, solutions B and C exhibited the $v_{nco}$ band at 2261 cm$^{-1}$ without having undergone loss of intensity. By contrast, the band had completely disappeared from the spectrum of the solution A, (the flask containing all three components) thus demonstrating the catalytic formation or urethane.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail within the scope of the claims.

The invention claimed is:

1. A soluble metal oxide comprising:
a plurality of metal oxide crystallite particles;
each crystallite particle comprising a plurality of metal and oxygen moieties;
an inner organic binding group attached to at least one metal moiety of a metal oxide crystallite particle; and
an outer organic binding group attached to at least one inner organic binding group,
wherein the metal moiety is selected from the group consisting of tin and titanium.

2. A soluble metal oxide as claimed in claim 1 wherein each crystallite particle further comprises at least one hydroxyl group.

3. A soluble metal oxide as claimed in claim 1 wherein;
each inner organic binding group is attached to each metal moiety by a covalent bond; and
each outer organic binding group is attached to each inner organic binding group by a hydrogen bond.

4. A soluble metal oxide as claimed in claim 1 of the general formula:

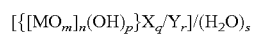

wherein:
M represents a metal moiety
O represents an oxygen moiety
m is a variable dependent on the oxidation state of the metal moiety (M) and is in the region of between 1 and 3
n represents the number of metal oxides in the crystallite particle
OH represents an hydroxyl group
X represents an inner organic binding group
Y represents an outer organic binding group
H$_2$O represents hydrogen bonded water
p, q, r and s represent variables dependent in particular on the number of metal oxides in the crystallite particle (n), and reaction conditions.

5. A soluble metal oxide as claimed in claim 4,
Wherein X represents the inner organic binding group of the general formula,

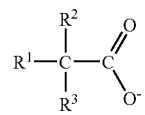

Wherein:
R$^1$=an organic group, a halo-organic group, a hydrogen or a halogen;
R$^2$=an organic group, a halo-organic group, a hydrogen or a halogen; and
R$^3$=an organic group, a halo-organic group, a hydrogen or a halogen.

6. A soluble metal oxide as claimed in claim 5, wherein
R$^1$ represents a straight-chain, branched chain or cyclic organic group with up to 20 carbons, a straight-chain, branched-chain, or cyclic halo-organic group with up to 20 carbons and up to 41 halogen atoms, a hydrogen or a halogen;
R$^2$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
R$^3$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

7. A soluble metal oxide as claimed in claim 4 wherein Y represents the outer organic binding group of the general formula:

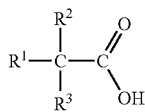

Wherein:
R¹=an organic group, a halo-organic group, a hydrogen or a halogen;
R²=an organic group, a halo-organic group, a hydrogen or a halogen; and
R³=an organic group, a halo-organic group, a hydrogen or a halogen.

8. A soluble metal oxide as claimed in claim 7, wherein
R¹ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen;
R² represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and
R³ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

9. A soluble metal oxide as claimed in claim 1 wherein each metal oxide crystallite particle is a nanocrystallite particle having an average particle size in the range of between 5 and 100 Å.

10. A soluble mixed metal oxide comprising:
the soluble metal oxide as claimed in claim 1 wherein each crystallite particle further comprises:
at least one metal ion attached to each crystallite particle.

11. A soluble mixed metal oxide as claimed in claim 10, wherein:
each inner organic binding group is attached to either a metal moiety or to both a metal moiety and to a metal ion;
each outer organic binding group is attached to either a metal ion, or to an inner organic binding group, or to both a metal ion and an inner organic binding group; and
wherein the metal ions are attached to any combination of the following:
an oxygen moiety;
an hydroxyl group;
an inner organic binding group; and
an outer organic binding group.

12. A soluble mixed metal oxide as claimed in claim 11 wherein:
each inner organic binding group is attached to each metal moiety by a covalent bond and to each metal ion by either a covalent bond or a donor bond;
each outer organic binding group is attached to each inner organic binding group by a hydrogen bond and to each metal ion by either a covalent bond or a donor bond; and
each metal ion is attached to each oxygen moiety by a covalent bond, to each hydroxyl group by either a donor bond or a covalent bond, to each inner organic binding group by either a covalent or a donor bond, and to each outer organic binding group by either a covalent or a donor bond.

13. A soluble mixed metal oxide as claimed in claim 10 of the general formula:

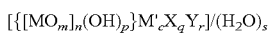

M represents a metal moiety

O represents an oxygen moiety m is a variable dependent on the oxidation state of the metal moiety (M) and is in the region of between 1 and 3 n represents the number of metal oxides in the crystallite particle

OH represents an hydroxyl group

M' represents a metal ion

X represents an inner organic binding group

Y represents an outer organic binding group $H_2O$ represents hydrogen bonded water c, p, q, r and s represent variables dependent in particular on the number of metal oxides in the crystallite particle (n), and reaction conditions.

14. A soluble mixed metal oxide as claimed in claim 13 wherein the metal ion (M') is selected from the group comprising of tetravalent tin, divalent tin, tetravalent titanium, divalent titanium, indium, antimony, zinc, titanium, vanadium, chromium, manganese, iron, cobalt, nickel, zirconium, molybdenum, palladium, iridium and magnesium.

15. A soluble mixed metal oxide as claimed in claim 13, wherein X represents the inner organic binding group of the general formula:

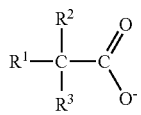

Wherein:
R¹=an organic group, a halo-organic group, a hydrogen or a halogen;
R²=an organic group, a halo-organic group, a hydrogen or a halogen; and
R³=an organic group, a halo-organic group, a hydrogen or a halogen.

16. A soluble mixed metal oxide as claimed in claim 15, wherein
R¹ represents a straight-chain, branched-chain or cyclic organic group with up to 20 carbons, a straight-chain, branched-chain, or cyclic halo-organic group with up to 20 carbons and up to 40 halogen atoms, a hydrogen or a halogen;
R² represents a straight-chain, branched-chain or cyclic organic group with up to 20 carbons, a straight-chain, branched-chain, or cyclic halo-organic group with up to 20 carbons and up to 40 halogen atoms, a hydrogen or a halogen; and
R³ represents a straight-chain, branched-chain or cyclic organic group with up to 20 carbons, a straight-chain, branched-chain, or cyclic halo-organic group with up to 20 carbons and up to 40 halogen atoms, a hydrogen or a halogen.

17. A soluble mixed metal oxide as claimed in claim 13 wherein Y represents the outer organic binding group of the general formula,

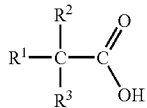

Wherein:

$R^1$=an organic group, a halo-organic group, a hydrogen or a halogen;

$R^2$=an organic group, a halo-organic group, a hydrogen or a halogen; and $R^3$=an organic group, a halo-organic group, a hydrogen or a halogen.

18. A soluble mixed metal oxide as claimed in claim 17, wherein:

$R^1$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen;

$R^2$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen; and $R^3$ represents a straight-chain, branched-chain or cyclic organic group with up to 20 carbons, a straight-chain, branched-chain, or cyclic halo-organic group with up to 20 carbons and up to 41 halogen atoms, a hydrogen or a halogen.

19. A soluble mixed metal oxide as claimed in claim 10 wherein each crystallite particle is a nanocrystallite particle having an average particle size in the range of between 5 and 100 Å.

* * * * *

UNITED STATES PATENT AND TRADEMARK OFFICE
CERTIFICATE OF CORRECTION

| | | |
|---|---|---|
| PATENT NO. | : 7,851,402 B2 | Page 1 of 1 |
| APPLICATION NO. | : 10/580097 | |
| DATED | : December 14, 2010 | |
| INVENTOR(S) | : Cunningham et al. | |

It is certified that error appears in the above-identified patent and that said Letters Patent is hereby corrected as shown below:

Title Page, See Item (75) Inventors: line 2, "James McManus, Athone (IE)" should read:
-- James Mc Manus, Athlone (IE) --

Signed and Sealed this
Third Day of May, 2011

David J. Kappos
*Director of the United States Patent and Trademark Office*